(12) United States Patent
Uchiyama et al.

(10) Patent No.: US 9,201,464 B2
(45) Date of Patent: Dec. 1, 2015

(54) TERMINAL APPARATUS

(71) Applicants: LENOVO (BEIJING) CO., LTD., Beijing (CN); BEIJING LENOVO SOFTWARE LTD., Beijing (CN)

(72) Inventors: Yoshiharu Uchiyama, Beijing (CN); Wenlin Hou, Beijing (CN); Junhua Shao, Beijing (CN); Huang Dai, Beijing (CN); Daye Yang, Beijing (CN)

(73) Assignees: LENOVO (BEIJING) CO., LTD., Beijing (CN); BEIJING LENOVO SOFTWARE LTD., Beijing (CN)

( * ) Notice: Subject to any disclaimer, the term of this patent is extended or adjusted under 35 U.S.C. 154(b) by 0 days.

(21) Appl. No.: 13/686,206

(22) Filed: Nov. 27, 2012

(65) Prior Publication Data

US 2013/0135809 A1    May 30, 2013

(30) Foreign Application Priority Data

Nov. 28, 2011  (CN) .......................... 2011 1 0384420
Jan. 11, 2012  (CN) .......................... 2012 1 0007611

(51) Int. Cl.
G06F 1/16  (2006.01)

(52) U.S. Cl.
CPC ............ G06F 1/1681 (2013.01); G06F 1/1618 (2013.01); *Y10T 16/547* (2015.01); *Y10T 16/5478* (2015.01)

(58) Field of Classification Search
CPC .............. Y10T 16/547; Y10T 16/5478; Y10T 16/53824; Y10T 16/53843; Y10T 16/53864; Y10T 16/551; G06F 1/1681; G06F 1/1616; G06F 1/1618; E05Y 2900/606; E05D 3/06; E05D 3/12; E05D 11/06; E05D 11/1021

USPC ................. 16/366, 371, 282, 294, 302, 374; 361/679.06, 679.27, 679.09; 248/921
See application file for complete search history.

(56) References Cited

U.S. PATENT DOCUMENTS 6,253,419 B1 *   7/2001  Lu ................................... 16/340
7,832,056 B2 * 11/2010  Kuwajima et al. ............... 16/354
(Continued)

FOREIGN PATENT DOCUMENTS

CN           101101020        1/2008
CN           201078392        6/2008
(Continued)

OTHER PUBLICATIONS

Partial English Translation of CN 201078392; 2 pages.
(Continued)

*Primary Examiner* — William Miller
(74) *Attorney, Agent, or Firm* — Dentons US LLP

(57) ABSTRACT

The embodiment of the invention provides a hinge device and a folded apparatus having such hinge device. The hinge device comprises a hinge bracket, a first axis, and a second axis provided being parallel with each other and supported rotatably by the hinge bracket, the first axis is connected to a first body of an apparatus, and the second axis is connected to a second body of the apparatus, the first body can rotate from 0 degree to 360 degree and/or from 360 degree to 0 degree with respect to the second body by being brought by the first axis and the second axis, wherein, when the first body rotates from 0 degree to a predetermined angle and/or from the predetermined angle to 0 degree with respect to the second body, the first axis rotates and the second axis rests, and wherein, when the first body rotates from the predetermined angle to 360 degree and/or from 360 degree to the predetermined angle with respect to the second body, the second axis rotates and the first axis rests.

30 Claims, 22 Drawing Sheets

(56) References Cited

U.S. PATENT DOCUMENTS

| | | | |
|---|---|---|---|
| 8,296,905 B2 * | 10/2012 | Zhang et al. | 16/366 |
| 8,451,601 B2 * | 5/2013 | Bohn et al. | 361/679.55 |
| 8,474,101 B2 * | 7/2013 | Wang et al. | 16/366 |
| 8,627,546 B2 * | 1/2014 | Zhang et al. | 16/368 |
| 8,776,319 B1 * | 7/2014 | Chang et al. | 16/366 |
| 2011/0265288 A1 * | 11/2011 | Chiang | 16/341 |
| 2013/0016492 A1 * | 1/2013 | Wang et al. | 361/820 |
| 2013/0194741 A1 * | 8/2013 | Uchiyama et al. | 361/679.26 |
| 2013/0318746 A1 * | 12/2013 | Kuramochi | 16/342 |

FOREIGN PATENT DOCUMENTS

| | | |
|---|---|---|
| CN | 101561697 | 10/2009 |
| CN | 201336006 | 10/2009 |
| CN | 101886662 | 11/2010 |
| CN | 201651021 | 11/2010 |
| CN | 202484069 | 10/2012 |
| DE | 2330788 C2 | 5/1984 |
| EP | 2112312 A2 | 10/2009 |
| GB | 1364188 | 8/1974 |
| JP | 2004308710 | 11/2004 |
| JP | 2004316382 | 11/2004 |
| JP | 200664000 | 3/2006 |
| JP | 2007100943 | 4/2007 |
| JP | 2007-198416 A | 8/2007 |
| KR | 20100082191 | 7/2010 |
| KR | 20100082191 A | 7/2010 |

OTHER PUBLICATIONS

English Abstract of CN 201078392; 1 page.
English Abstract of CN 101886662; 1 page.
Partial English Translation of CN 201651021; 1 page.
English Abstract of CN 201651021; 1 page.
English Translation of JP 200664000; 18 pages.
English Abstract of CN 201336006; 1 page.
Chinese Patent Application No. 201110384420.0, Chinese Patent Office, First Office Action mailed Nov. 8, 2013; 7 pages.
English Translation of the First Office Action for Chinese Patent Application No. 201110384420.0, Chinese Patent Office, Office Action mailed Nov. 8, 2013; 8 pages.
English Translation of JP 2004308710; 40 pages.
English Translation of JP 2004316382; 7 pages.
Chinese Patent Application No. 201210007611.X; State Intellectual Property Office of People's Republic of China, First Office Action mailed on Aug. 5, 2014; 16 pages.
English Translation of First Office Action for Chinese Patent Application No. 201210007611.X; State Intellectual Property Office of People's Republic of China, First Office Action mailed on Aug. 5, 2014; 20 pages.
English Abstract of Chinese Patent Application No. 202484069U; Published on Oct. 10, 2012; 1 page.
English Abstract of Japanese Patent Application No. 2007100943A; Published on Apr. 19, 2007; 1 page.
English Translation of Japanese Patent Application No. 2007100943A; Published on Apr. 19, 2007; 28 pages.
English Abstract of Chinese Patent Application No. 101561697A; Published on Oct. 21, 2009; 2 pages.
English Partial Translation of Chinese Patent Application No. 101561697A; Published on Oct. 21, 2009; 5 pages.
English Abstract of Chinese Patent Application No. 101101020A; Published on Jan. 9, 2008; 1 page.
English Abstract of Korean Patent Application No. 20100082191A; Published on Jul. 16, 2010; 1 page.
Korean Patent Application No. 10-2012-0135297, Korean Patent Office, First Office Action mailed on Dec. 18, 2013; 7 pages.
English Text of Korean Patent Application No. 10-2012-0135297, Korean Patent Office, First Office Action mailed on Dec. 18, 2013; 7 pages.
Korean Patent Application No. 10-2012-0135297, Korean Patent Office, Second Office Action mailed on Jun. 26, 2014; 4 pages.
English Text of Korean Patent Application No. 10-2012-0135297, Korean Patent Office, Second Office Action mailed on Jun. 26, 2014; 3 pages.
Korean Patent Application No. 10-2012-0135297, Korean Patent Office, Third Office Action mailed on Aug. 28, 2014; 3 pages.
English Text of Korean Patent Application No. 10-2012-0135297, Korean Patent Office, Third Office Action mailed on Aug. 28, 2014; 2 pages.
German Patent Application No. 10 2012 111 508.7, German Patent Office, Office Action mailed on Aug. 16, 2013; 7 pages.
English Text of German Patent Application No. 10 2012 111 508.7, German Patent Office, Office Action mailed on Aug. 16, 2013; 4 pages.
Chinese Patent Application No. 201210007611.X; State Intellectual Property Office of People's Republic of China, Second Office Action mailed on Mar. 17, 2015; 15 pages.
English Text Translation of the Second Office Action for Chinese Patent Application No. 201210007611.X; State Intellectual Property Office of People's Republic of China, mailed on Mar. 17, 2015; 21 pages.

* cited by examiner

TERMINAL APPARATUS

CROSS REFERENCE TO RELATED APPLICATIONS

This application is based upon and claims the benefit of priority from the prior Chinese Patent Applications CN 201110384420.0, filed in the State Intellectual Property Office of the P.R.C. on Nov. 28, 2011, and CN 201210007611.X, filed on Jan. 11, 2012, the disclosures of which are hereby incorporated by reference in their entireties.

BACKGROUND

The present invention relates to a hinge device and a folded apparatus and portable terminal having such hinge device.

Currently, in the portable terminal such as notebook computer and the like, a so-called clam-shell type hinge device that opens and closes folded is mainly used, that is, a cover part having a display part and a body part having a key operation part can connect folded in form of pages.

As such clam-shell type hinge device of portable terminal, in recent years, there proposes various structures. In patent document 1, there proposes following bi-axes hinge structure, i.e., the linkage strip such as rope is connected with one hinge body, and is connected with another hinge body after communicating between the two axes to cause the two axes to move and integrate in a way of rotating inversely. However, the bi-axis hinge can only implement a 180 degree open-close, and it generates slide due to the extension and contraction of the linkage strip.

Further, in patent document 2, there proposes a following bi-axis hinge structure, i.e., the rotary order of the first housing and the second housing connected with the respective axes of the hinge is always made to be certain. However, the bi-axis hinge structure can only implement a 180 degree open-close, too, and the motion is not smooth.
Patent document 1: (Japan) laid-open No. 2004-316382 publication
Patent document 2: (Japan) laid-open No. 2004-308710 publication Further, with the development of the miniaturization of the portable terminal, the flat computer is getting the favor of the consumer, therefore, it desires that the portable terminal, such as the notebook computer, can implement 360 degree open-close to become a flat computer.

SUMMARY

The invention is made for the above problem, and the object thereof is to provide a bi-axis hinge device and a portable terminal capable of carrying out 360 degree open-close motion stably and smoothly.

According to the first aspect of the invention, it provides a hinge device, having a first rotating center axis and a second rotating center axis, the first rotating center axis and the second rotating center axis being axially supported in a manner of being parallel with each other, the first and the second rotating center axis being mounted on a bracket plate in a rotatable manner by inserting the first and the second rotating center axes to a hole provided on the bracket plate, wherein, the hinge device further comprising: a cam provided on the first rotating center axis and having a convex part protruding in the direction of the rotating center axis, rotating integrated with the first rotating center axis; a cam locking part provided on the first rotating center axis and having a concave part being locked with the convex part of the cam depressed in the direction of the rotating center axis and rotating in relative to the cam; press force applying device, press the cam and the cam locking part toward the direction that is closer to each other to apply force; a stop part provided on the second rotating center axis and rotating integrated with the second rotating center axis; a blocker provided at a prescribed position on the bracket plate corresponding to the stop part of the second rotating center axis, the rotary angle of the second rotating center axis being restricted by jointing against the stop part and the blocker of the second rotating center axis, any axis in the first and the second rotating center axes is made to carry out the motion of rotating with respect to the bracket plate and bringing the bracket plate to rotate with respect to another axis in order when the hinge device acts.

According to the first aspect of the invention, since the cam and the cam locking part are provided on the first rotating center axis, the stop part is provided on the second rotating center axis, the blocker is provided on the bracket plate, the rotary angle of the first rotating center axis is restricted by the lock of the cam and the cam locking part, the rotary angle of the second rotating center axis is restricted by jointing against the stop part and the blocker of the second rotating center axis, any axis of the first and the second rotating center axes is made to carry out the motion of rotating with respect to the bracket plate and bringing the bracket plate to rotate with respect to another axis when the hinge device acts, thus, an open-close motion for a 360 degree rotation can be implemented.

In the second aspect of the invention, based on the first aspect, it is preferably that, if the stop part and the blocker of the second rotating center axis joint against when the hinge device acts, then the second rotating center axis stops rotation, and at this time the first rotating center axis will response to a further applied active force to start the rotary motion.

According to the second aspect of the invention, if the stop part and the blocker of the second rotating center axis joint against, the rotation of the second rotating center axis stops, at this time, if an active force is further applied, the first rotating center axis will start the rotary motion due to the active force. Therefore, it is possible to implement an open-close motion for a 360 degree rotation, and the motion is smooth and stable.

In the third aspect of the invention, based on the second aspect, it is preferably that constant moments of the first rotating center axis and the second rotating center axis are set to T1 and T2 respectively and let T2>T1, the moment required for the convex part of the cam releasing from the concave part of the cam locking part is set to T3, and let T3>T2>T1.

According to the third aspect, by setting the constant moment of the rotating center axis and the moment for the cam releasing lock, it is possible to implement an open-close motion of a 360 degree rotation, and the motion is smooth and stable.

In the fourth aspect of the invention, there provides a hinge device, having a first rotating center axis and a second rotating center axis, the first rotating center axis and the second rotating center axis being axially supported in a manner of being parallel with each other, the first and the second rotating center axes are mounted on a bracket plate in a rotatable manner by inserting the first and the second rotating center axes to hold, provided on the bracket plate respectively, wherein, the hinge device further comprises: a first stop part provided on the first rotating center axis and rotating integrated with the first rotating center axis; a second stop part provided on the second rotating center axis and rotating integrated with the second rotating center axis; a first blocker provided on a prescribed position of the bracket plate corresponding to the first stop part; a second blocker provided on a prescribed position of the bracket plate corresponding to the second stop part, the rotary angle of the first rotating center axis is restricted by jointing against the first stop part and the first blocker, and the rotary angle of the second rotating center axis is restricted by jointing against the second stop part and the second blocker, any axis of the first and the second rotating center axes is made to carry out a motion of rotating with respect to the bracket plate and bringing the bracket plate to rotate with respect to another axis in order when the hinge device acts.

According to the fourth aspect of the invention, since the first stop part is provided on the first rotating center axis, the second stop part is provided on the second rotating center axis, the first and the second blockers are provided on the bracket plate, the rotary angle of the first rotating center axis is restricted by jointing against the first stop part and the first blocker, the rotary angle of the second rotating center axis is restricted by jointing against the second stop part and the second blocker, any axis of the first and the second rotating center axes is made to carry out a motion of rotating with respect to the bracket plate and bringing the bracket plate to rotate with respect to another axis when the hinge device acts, thus, an open-close motion of a 360 degree rotation can be implemented.

In the fifth aspect of the invention, based on the fourth aspect, it is preferably that if the first stop part and the first blocker joint against when the hinge device acts, the first rotating center axis is made to stop rotation, and at this time the second rotating center axis will respond to a further applied active force to start to rotate, and if the second stop part and the second blocker joint against, the second rotating center axis is made to stop rotation, and at this time the first rotating center axis will respond to a further applied active force to start the rotary motion.

According to the fifth aspect of the invention, if the first stop part and the first blocker joint against, the rotation of the first rotating center axis is made to stop, at this time, if an active force is further applied, the second rotating center axis will start to rotate due to the active force; on the other hand, if the second stop part and the second blocker joint against, the rotation of the second rotating center axis is made to stop, and at this time, if an active force is further applied, the first rotating center axis will start the rotary motion by using the active force. Therefore, the first and the second rotating center axis rotate in order so that it is possible to implement an open-close motion of a 360 degree rotation, and the motion is smooth and stable.

In the sixth aspect of the invention, based on the fourth or the fifth aspect, it is preferably that the first blocker is mounted in adjacent to one end of the bracket plate of the first rotating center axis, the second blocker is mounted in adjacent to the other end of the bracket plate of the second rotating center axis in a manner of being 90 degree with respect to the first blocker.

In the seventh aspect of the invention, based on the sixth aspect, it is preferably that the hinge device further comprises: a cam provided on the first rotating center axis and having a convex part protruding in the direction of the rotating center axis, and rotating integrated with the first rotating center axis; a cam locking part provided on the first rotating center axis and having a concave part locked with the cam depressed in the direction of the rotating center axis, and rotating in relative to the cam; a press force applying device, which presses the first cam and the cam locking part toward the direction that is closer to each other with application of force.

According to the sixth aspect and the seventh aspect of the invention, it is possible to implement a self-locking function and a click sense when the hinge device extends to 90 degree and 270 degree.

In the eighth aspect of the invention, based on the second aspect, it is preferably that the constant moments of the first rotating center axis and the second rotating center axis are set to T1 and T2 respectively and let T2>T1, the moment required for the convex part of the cam releasing from the concave part of the cam locking part is set to T3, and let T3>T2>T1.

According to the eighth aspect, by setting the constant moment of the rotating center axis and the moment of the cam releasing lock, it is possible to implement an open-close motion of a 360 degree rotation, and the motion is smooth and stable.

In the ninth aspect of the invention, based on the fourth or the fifth aspect, it is preferably that the first blocker is mounted in adjacent to one end of the bracket plate of the first rotating center axis and the second blocker is mounted in adjacent to the other end of the bracket plate of the second rotating center axis in a manner of being 180 degree with respect to the first blocker.

In the tenth aspect of the invention, based on the ninth aspect, it is preferably that the hinge device further comprises: cams provided on the first and the second rotating center axes respectively and having convex parts protruding in the direction of the rotating center axis, and rotating integrated with the rotating center axes; cam locking parts provided on the first and the second rotating center axes respectively and having concave parts locked with the cam depressed in the direction of the rotating center axis, and rotating in relative to the cams; a press force applying device, which presses the cams and the cam locking parts toward the direction that is closer to each other with application of force.

According to the ninth aspect and the tenth aspect, it is possible to implement a self-locking function and click sense when the hinge device extends to 180 degree.

In the eleventh aspect of the invention, based on the second aspect, it is preferably that the constant moments of the first rotating center axis and the second rotating center axis are set to T1 and T2 respectively and let T2>T1, the moment required for the convex parts of the cams releasing from the concave parts of the cam locking parts is set to T3, and let T3>T2=T1.

According to the eleventh aspect, it is possible to make the extension operation easily and stably and smoothly.

In the twelfth aspect of the invention, based on the third or the fourth aspect, it is preferably that a S-shape warping member is provided on the first and the second rotating center axes, the first and the second blocker are provided on the position far away from the ends of the bracket plate in a manner of being opposite to each other.

According to the twelfth aspect, the hinge device can implement an open-close motion of 360 degree rotation with a simple configuration.

In the thirteenth aspect of the invention, based on the twelfth aspect, it is preferably that the first rotating center axis and the second rotating center axis are assembled in a manner of having a 180 degree difference of rotary angle, the constant moment of the first rotating center axis is less than the constant moment of the second rotating center axis as the open motion of the hinge device; and the constant moment of the first rotating center axis is larger than the constant moment of the second rotating center axis as the close operation of the hinge device.

According to the thirteenth aspect, when the hinge device carries out an open motion, let the force of 0°-180° rotary motion less than the force of 180°-360° rotary motion; when the hinge device carries out a close motion, let the force of 360°-180° rotary motion less than the force of 180°-0° rotary motion. Therefore, different operational senses are given to the user and it makes the user grasp the open-close operation easily.

In the fourteenth aspect of the invention, there provides a portable terminal having the hinge device according to the above-mentioned aspects.

According to the fourteenth aspect of the invention, it is possible to obtain a portable terminal which carries out a 360 degree open-close motion stably and smoothly and become flat as opening to 360 degree.

SYMBOL DESCRIPTION

Figure 1:
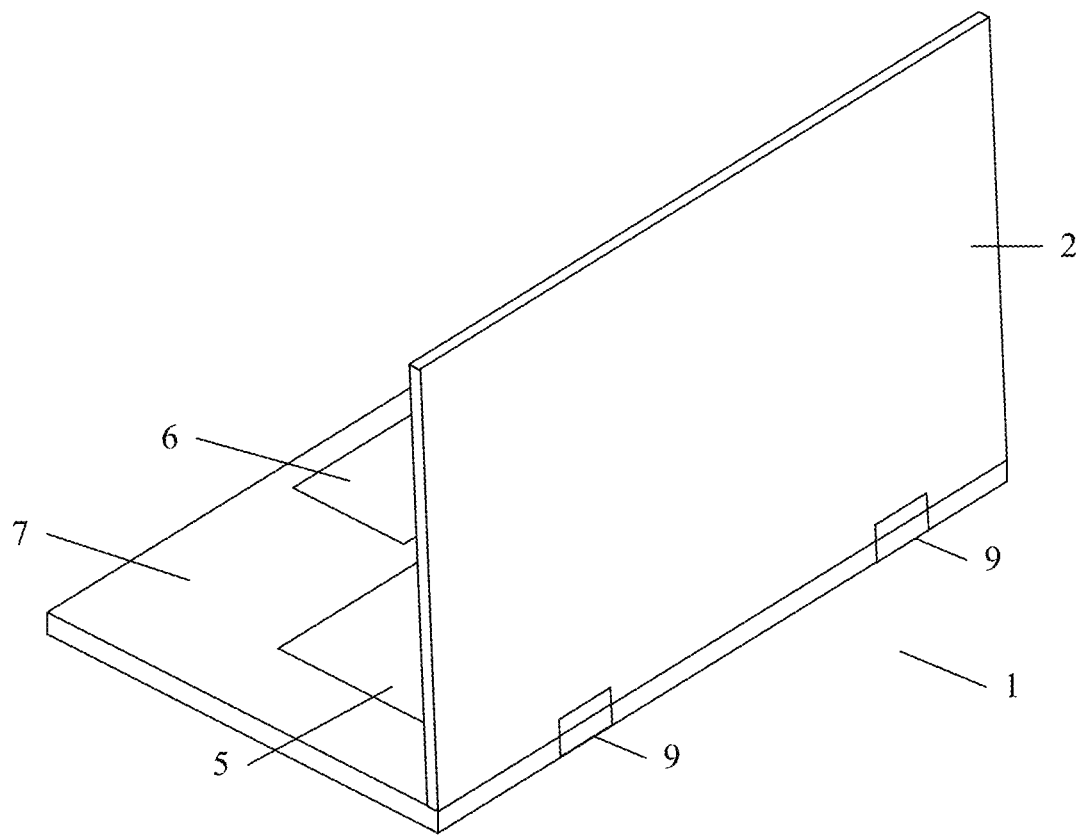
FIG. 1 is a stereogram expressing the appearance of a notebook computer assembled with a hinge device.

1: notebook computer (portable terminal)
2: cover body
5: key configuration plane
6: touch panel
7: main body
9, 90: hinge device
10, 100: first rotating center axis
20, 200: second rotating center axis
30, 300: bracket plate
11, 21: stop part
11a, 21a: head part
11b, 21b: axis part
12, 22: gasket
13, 23: cam locking part
13a, 23a: protruding part
14, 24: cam
15, 25: gasket
16, 26: reed
17, 27: gasket
18, 28: fasten nut
31, 32: via hole
33, 34: blocker
35, 36: fixing hole
110, 210: stop part
110a, 210a: head part
110b, 210b: axis part
150, 250: rotating axis center
330, 340: blocker
400: wrapping member
410: first axis sleeve
420: second axis sleeve
430: connecting portion

DETAILED DESCRIPTION

Hereinafter, the preferred embodiments of the invention are described with reference to the accompany drawings.

FIG. 1 is a stereogram of the appearance of a notebook computer 1.

The notebook computer 1 is composed of a main body 7 and a cover body 2, wherein, the main body 7 has a key configuring surface 5 configured with keys such as input key or the like and a touch panel 6, the cover body 2 has a display surface not illustrated configured with liquid crystal panel or the like. The cover body 2 and the main body 7 are connected through a hinge device 9 in a manner of capable of opening and closing folded from the close status of the key configuring surface 5 coinciding with and face to the display surface to the open status of rotating 360 degree to open.

Figure 2:
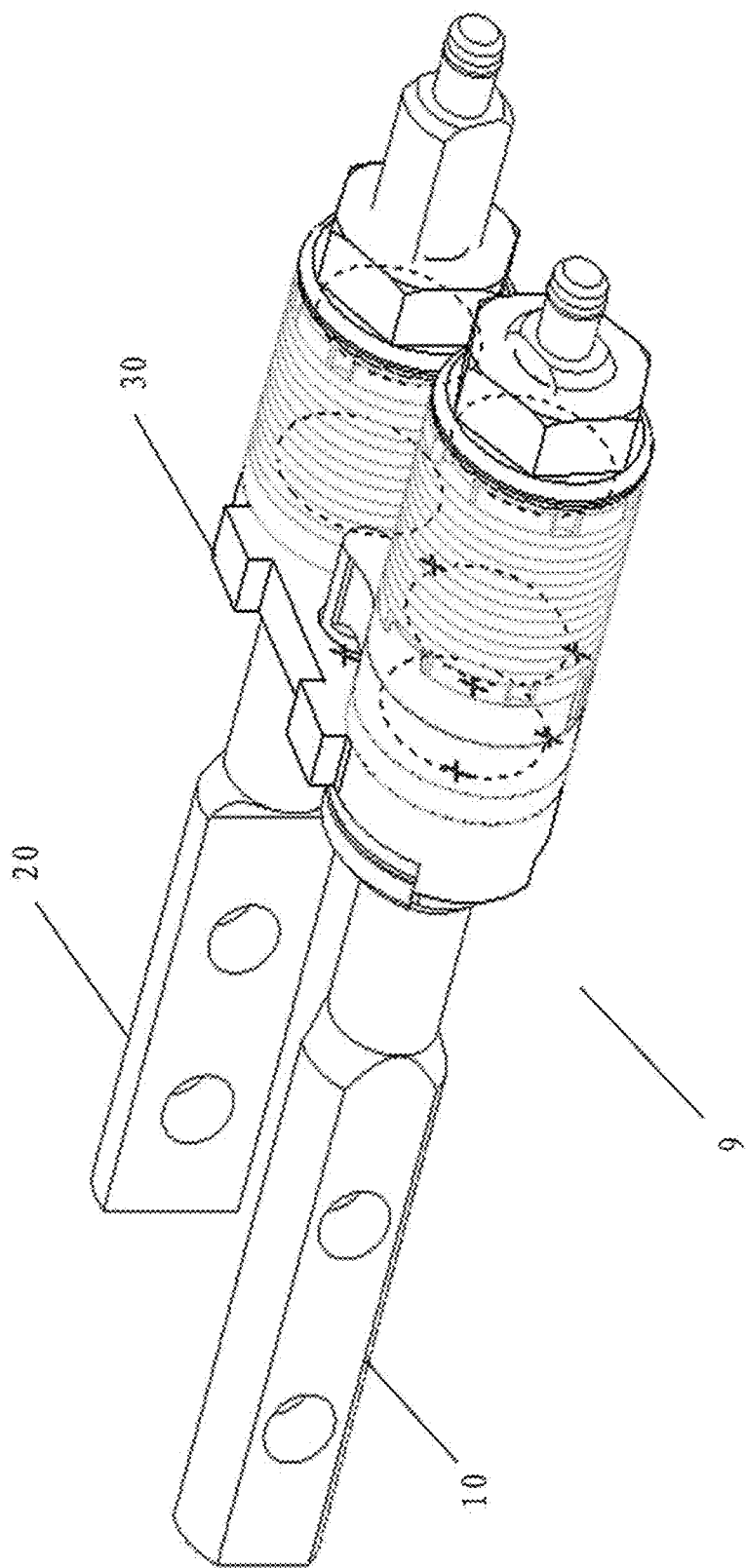
FIG. 2 is a stereogram of the status of the hinge device of the first embodiment of the invention with the casing removed.
Figure 3:
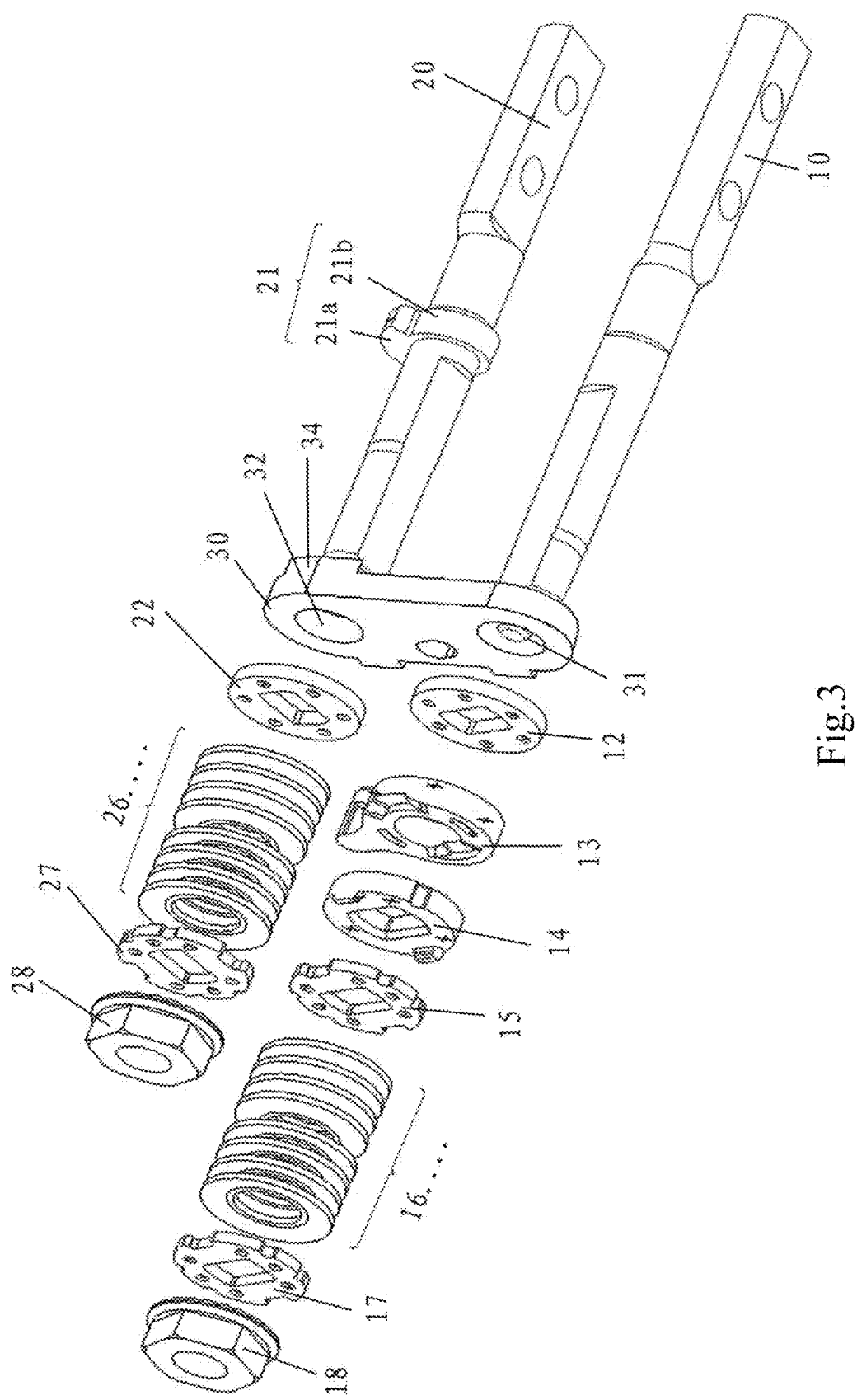
FIG. 3 is an exploded stereogram of the hinge device of the first embodiment of the invention.
Figure 4:
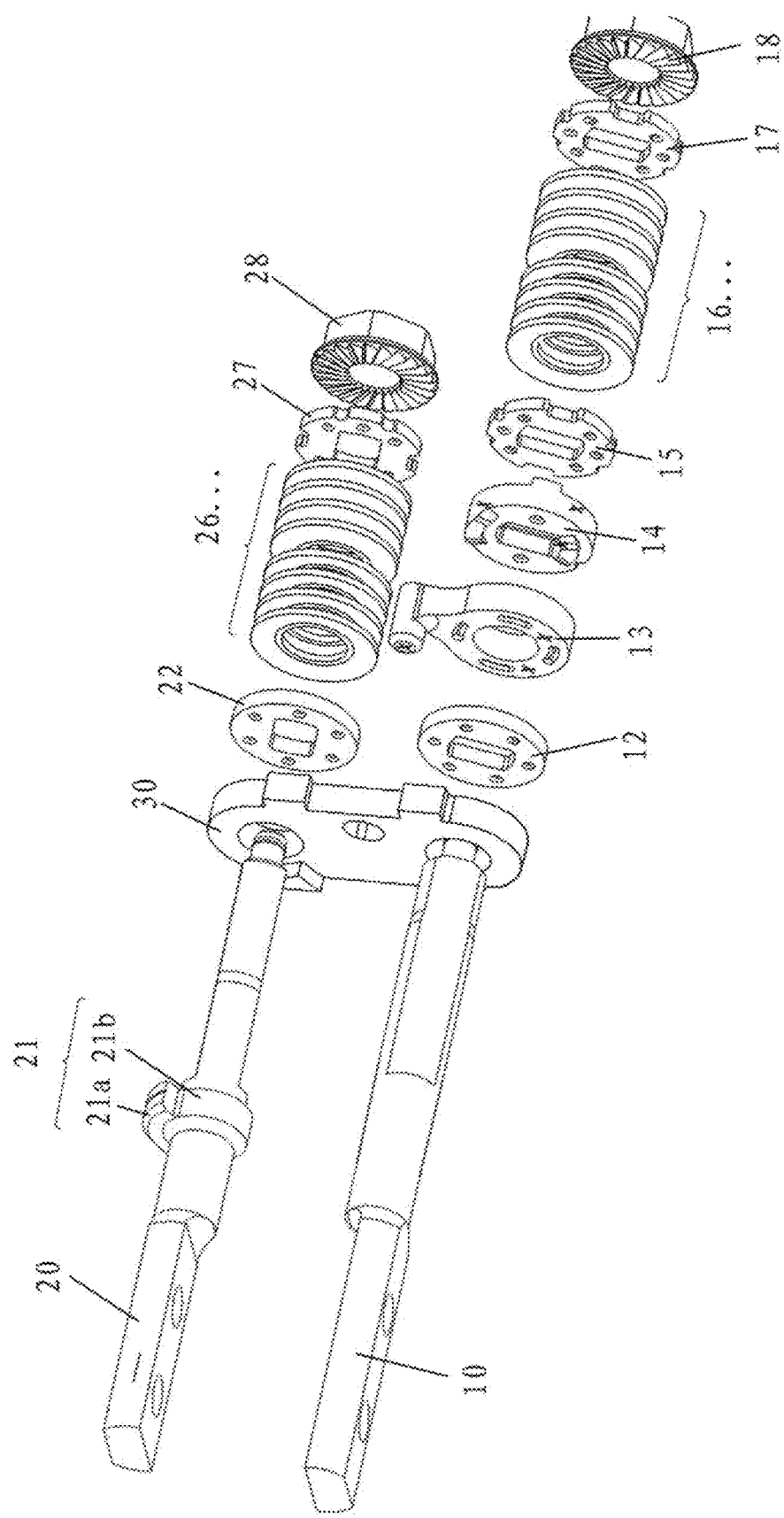
FIG. 4 is an exploded stereogram of the hinge device of the first embodiment of the invention.

FIG. 2 is a stereogram of a status of the hinge device 9 of the first embodiment of the invention with casing removed, FIG. 3 and FIG. 4 are exploded stereogram expressing the hinge device 9 of the first embodiment of the invention.

The hinge device 9 is configured as a bi-axis hinge device, has a first rotating center axis 10; a second rotating center axis 20; a bracket plate 30 axially supporting the first and the second rotating center axes 10 and 20 and making them parallel with each other; a housing not illustrated.

A gasket 12, a cam locking part 13, a cam 14, a gasket 15 and a plurality of reeds 16 . . . a gasket 17 and a fasten nut are mounted by inserting in order from the side of the bracket plate 30 on the first rotating center axis 10. As in the related art, the constant moment of the first rotating center axis 10 is set by the pre-tightening force of the fasten nut 18, herein, it is set to T1.

The cam 14 rotates integrated with the first rotating center axis 10 and is fixed with respect to the first rotating center axis 10. The cam 14 is provided with a convex part protruding in the direction of the rotating center axis on a side opposite to the cam locking part 13, the cam locking part 13 is provided with a concave part locked with the convex part of the cam 14 depressed in the direction of the rotating center axis on a side opposite to the cam 14, and a protrusion part 13a protruding to the bracket plate 30 is provided extended on one end of the cam locking part 13. The cam locking part 13 is fixed with respect to the bracket plate 30 by inserting the protrusion part 13a to the fixing hole 35 provided on the bracket plate 30 and is made to rotate relative to the cam 14.

The cam 14 and the cam locking part 13 set the position of the convex part and the concave part in a manner of being locked with each other as rotating 90 degree from an initial status, and set the moment required for the convex part of the cam 14 releasing from the concave part of the cam locking part 13 to T3 (T3>T1). The set of the moment T3 can be carried out by adjusting the height and the gradient of the convex part of the cam 14 and the depth and the gradient of the concave part of the cam locking part 13 as in the related art.

A gasket 22, a plurality of reeds 26 . . . a gasket 27 and a fasten nut 28 are inserted in order from a side of the bracket plate 30 on the second rotating center axis 20, and a stop part 21 is provided on the other side of the bracket plate 30. The stop part 21 is compose of an axis part 21b with approximately cylinder shape and a head part 21a with approximately sector shape having a periphery larger than that of the axis part 21b. The constant moment T2 of the second rotating center axis 20 is set by the pre-tightening force of the fasten nut 28, herein, it is set to T3>T2>T1.

The bracket plate 30 is made of a rigid material, and via holes 31 and 32 are provided thereon. The first and the second rotating center axes are fixed on the bracket plate 30 and made to rotate freely by inserting the first and the second rotating center axes 10 and 20 to the via holes 31, 32, respectively. Further, a blocker 34 jointing against the stop part 21 is provided on the bracket plate 30.

In a hinge device 9 with such configuration, the first rotating center axis 10 is connected with the cover body 2 and is fixed, the second rotating center axis 20 is connected with the main body 7 and is fixed. Therefore, with the rotary motion in the direction of open-close of the cover body 2 and the main body 7, the first rotating center axis 10 and the second rotating center axis 20 rotate.

Figure 5:
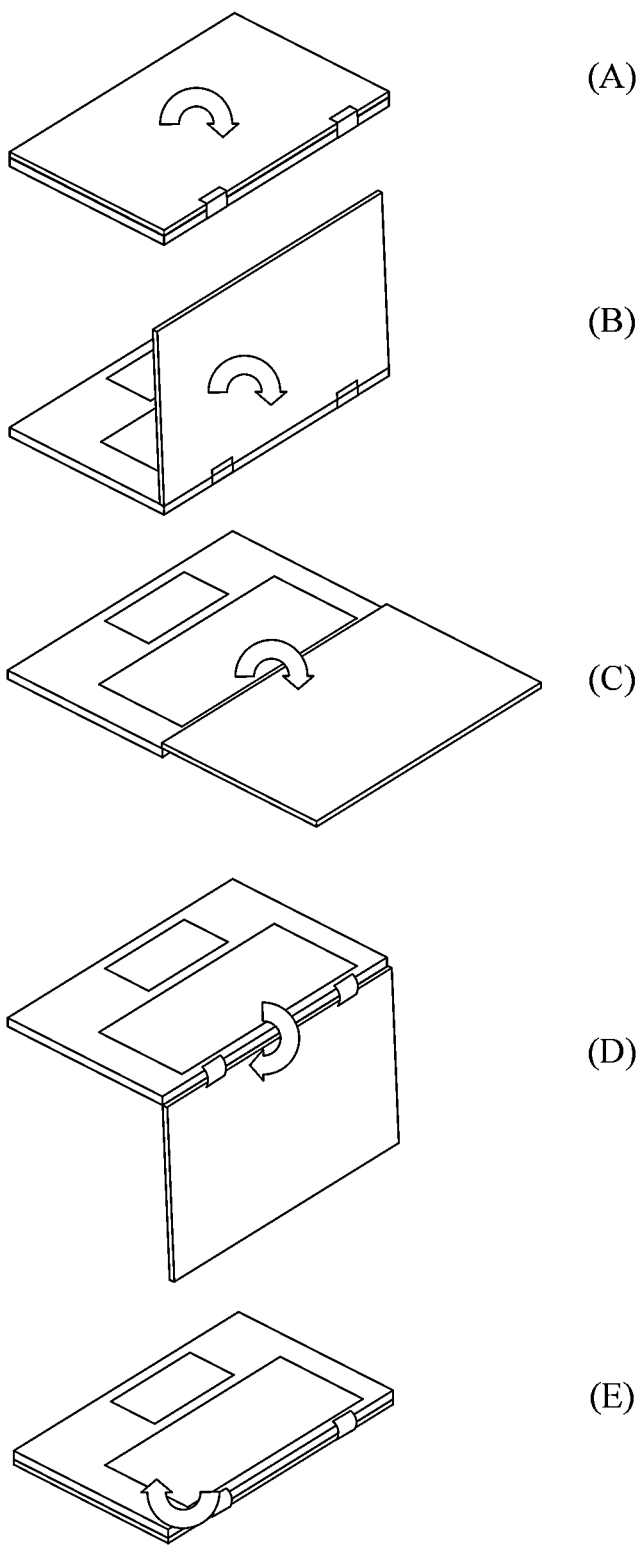
FIG. 5(A)-(E) are explanatory drawings of explaining the 360 degree open motion of the notebook computer by stereogram.
Figure 6:
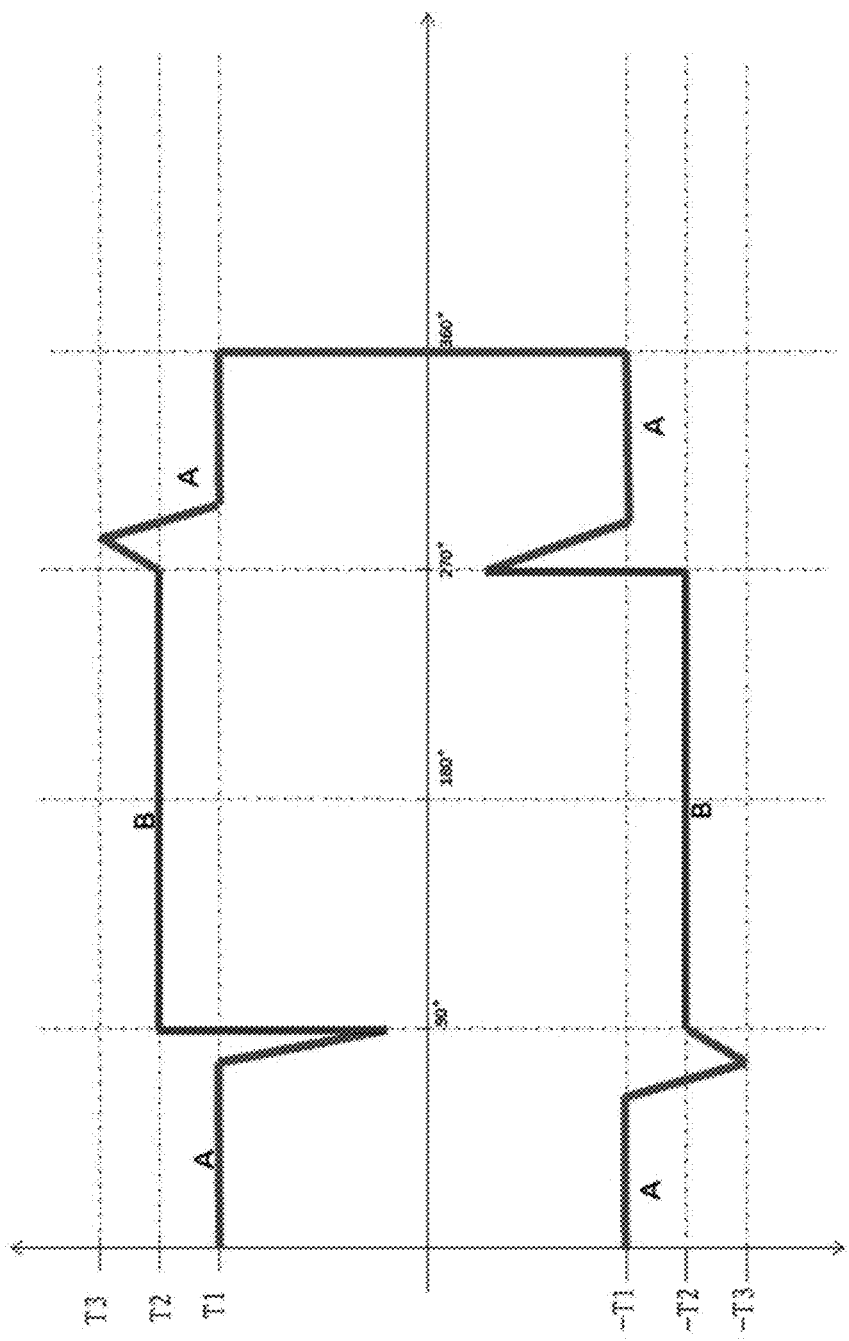
FIG. 6 is a graph of moment generated by the motion of the hinge device of the first embodiment of the invention.

FIG. 5 is an explanatory view explaining a 360 degree open motion of the notebook computer by stereogram, FIG. 6 is a graph for explaining a moment generated by the motion of the hinge device of the first embodiment of the invention.

As shown in FIG. 5(A), generally, the main body 7 of the notebook computer 1 is placed on a surface of a desk, etc., in a close status that the cover body 2 and the main body 7 of the notebook computer 1 close, the first rotating center axis 10 connected with the cover body 2 starts to rotate by an active force for open when the active force is applied to the cover body 2, as shown in FIG. 6, a moment of which size is T1 is generated. Since the constant moment of the second rotating center axis 20 is T2, and it is larger than T1, thus at this time, only the first rotating center axis 10 rotates, and the second rotating center axis 20 does not rotate.

Next, as shown in FIG. 5(B), the first rotating center axis 10 rotates to approximate 90 degree when the cover body 2 and the main body 7 of the notebook computer 1 rotate to open to approximate 90 degree, the convex part of the cam 14 of the first rotating center axis 10 is brought into the concave part of the cam locking part 13 and locked therewith, as shown in FIG. 6, a transient moment reduction is generated. Since the moment T3 required for the convex part of the cam 14 releasing from the concave part of the cam locking part 13 is larger than T1 and T2, thus, the active force for open reaches T2 before reaching T3 when a larger active force for open is applied for a further open. At this time, since the cam 14 of the first rotating center axis 10 is locked with the cam locking part 13, thus, the first rotating center axis 10 is made to stop rotation, the active force for open applied on the first rotating center axis 10 brings the bracket plate 30 to rotate with respect to the second rotating center axis 20. For the convenience of explanation, at this time, the second rotating center axis 20 is regarded as rotating with respect to the bracket plate 30.

Next, as shown in FIG. 5(C)-(D), the second rotating center axis 20 rotates 180 degree with respect to the bracket plate 30 when the cover body 2 and the main body 7 of the notebook computer 1 rotate to open to 270 degree, the stop part 21 of the second rotating center axis 20 and the blocker 34 of the bracket plate 30 joint against and restrict the further rotation of the second rotating center axis 20. At this time, a larger active force for open is applied for a further open, when the active force reaches T3, the convex part of the cam 14 of the first rotating center axis 10 is made to release from the concave part of the cam locking part 13 and the lock is released, the first rotating center axis 10 starts to rotate, as shown in FIG. 6, a moment T3 is generated when the convex part of the cam 14 is released from the concave part of the cam locking part 13, thereafter, it restores to the constant moment T1 required for the rotation of the first rotating center axis 10.

Next, when the first rotating center axis 10 rotates 90 degree, as shown in FIG. 5 (D), the cover body 2 and the main body 7 of the notebook computer 1 open to 360 degree to become a folded status, the open motion is completed.

Hereinafter, the motion of the hinge device 9 of the first embodiment when the cover body 2 and the main body 7 of the notebook computer 1 close from 360 degree to 0 degree is described briefly with reference to FIG. 6.

When a close operation is carried out from the folded status of fully open for the cover body 2 and the main body 7 of the notebook computer 1, an active force for close is applied to the cover body 2, the first rotating center axis 10 connected with the cover body 2 starts to rotate, a moment −T1 is generated, the second rotating center axis 20 does not rotate.

When the cover body 2 and the main body 7 of the notebook computer 1 close to approximate −90 degree, i.e., the first rotating center axis 10 rotates inversely to approximate 90 degree, the convex part of the cam 14 of the first rotating center axis 10 is brought into the concave part of the cam locking part 13 and is locked therewith, a transient moment reduction is generated. Thereafter, if an active force for close is further applied, the active force for close firstly reach −T2 before reaching −T3, the active force for close applied on the first rotating center axis 10 brings the bracket plate 30 rotate with respect to the second rotating center axis 20, and the first rotating center axis 10 stops rotation. For the convenience of explanation, at this time, the second rotating center axis 20 is also regarded as rotating with respect to the bracket plate 30.

Next, when the cover body 2 and the main body 7 of the notebook computer 1 close to −270 degree, i.e., the second rotating center axis 20 rotates inversely for 180 degree with respect to the bracket plate 30, the stop part 21 of the second rotating center axis 20 and the blocker 34 of the bracket plate 30 joint against and restrict the further rotation of the second rotating center axis 20. At this time, when a larger active force for close is applied for a further close, the cam 14 of the first rotating center axis 10 is made to release form the concave part of the cam locking part 13, and the first rotating center axis 10 is made to start to rotate.

When the first rotating center axis 10 rotates inversely for 90 degree, the cover body 2 and the main body 7 of the notebook computer 1 get close to 0 degree and become a close status, the close motion is completed.

The hinge device 9 of the first embodiment can implement a stable and smooth 360 degree open-close motion by making the first and the second rotating center axis rotate with respect to bracket plate in turn. Further, since the cam 14 and the cam locking part 13 locked as rotating 90 degree from the initial status are provided on the first rotating center axis 10, the stop part 21 and the blocker 34 for restricting a further rotation of the second rotating center axis when the second rotating center axis rotates to 180 degree are provided, and let T3>T2>T1, it is possible to implement a self-locking function and giving a click sense when the notebook computer opens to 270 degree.

Figure 7:
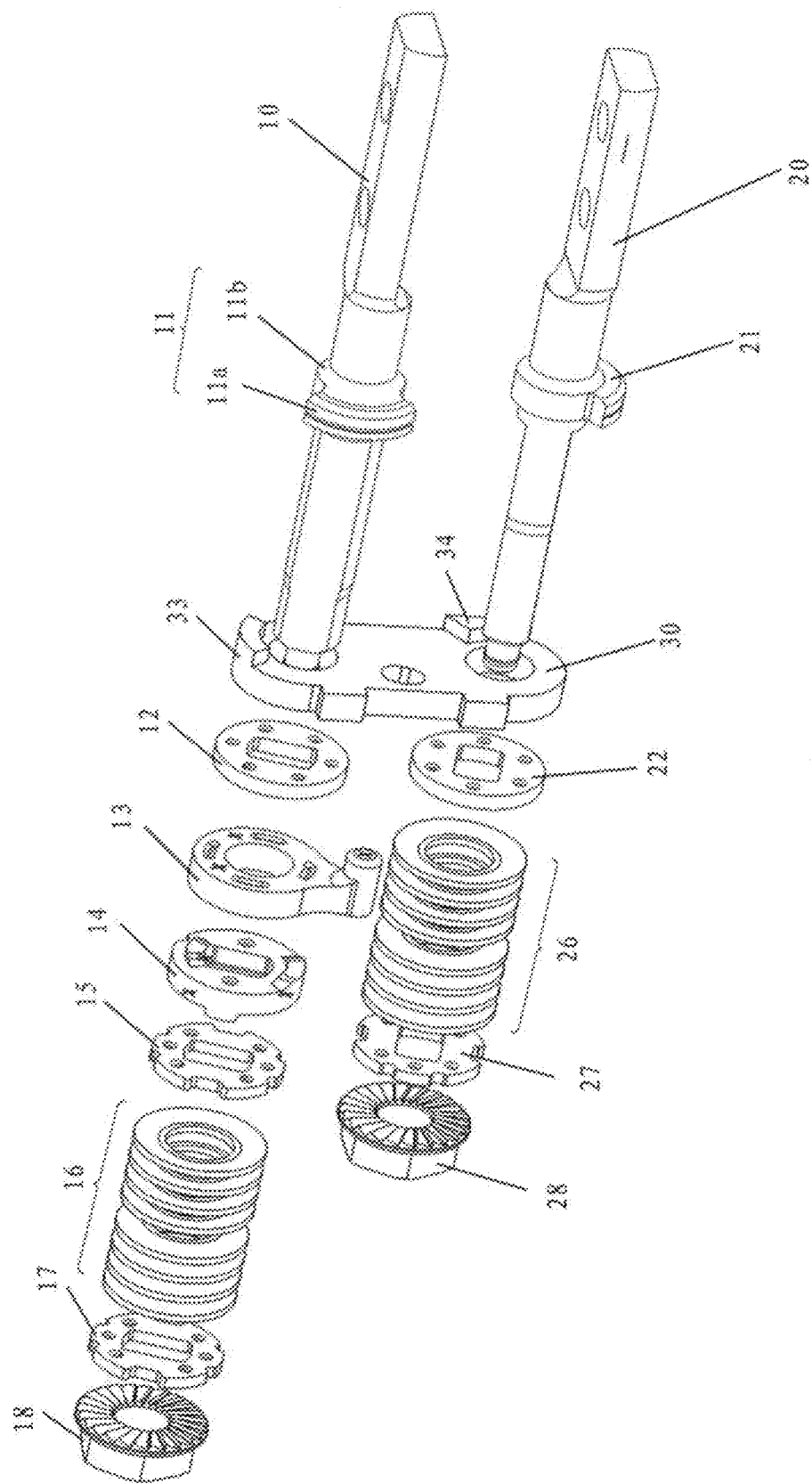
FIG. 7 is a exploded stereogram of the schematic configuration of the hinge device of the second embodiment of the invention.
Figure 8:
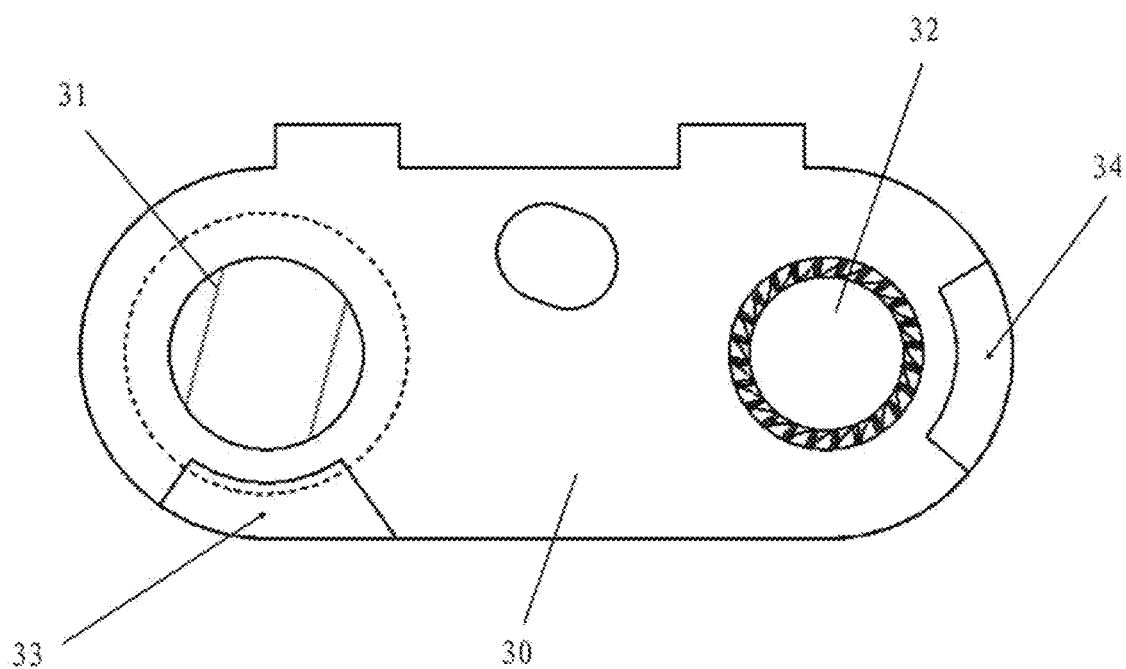
FIG. 8 is a drawing of the configuration of the blocker on the bracket plate of the hinge device of the second embodiment of the invention.

Hereinafter, with reference to FIG. 7, FIG. 8 illustrates a hinge device of the second embodiment of the invention. FIG. 7 is an exploded stereogram of the schematic configuration of the hinge device of the second embodiment of the invention, FIG. 8 is a drawing for the configuration of the blocker on the bracket plate of the hinge device of the second embodiment of the invention.

The difference of the hinge device of the second embodiment from the hinge device of the first embodiment is that a stop part 11 is provided on the first rotating center axis 10 and a blocker 33, jointed against the stop part 11, is provided on the bracket plate 20. Other structures are substantially the same as the hinge device of the first embodiment, a same reference number is given to a same member and the detailed explanation is omitted.

The stop part 11 of the first rotating center axis 10 is composed of an axis part 11b of approximately cylinder shape and a head part 11a of approximately cylinder shape having a periphery larger than that of the axial part 11b, and is integrated with the first rotating center axis 10. The stop part 11 and the gasket 12 are provided on both sides of the bracket plate 30 in a manner that the bracket plate 30 is sandwiched therebetween.

As shown in FIG. 8, the blocker 33 is provided on one end of the bracket plate 30 in adjacent to the via hole 31, the blocker 34 is provided on one end of the bracket plate 30 in adjacent to the via hold 32, and the provided positions of the blocker 33 and the blocker 34 have a 90 degree angle.

Hereinafter, a motion of the hinge device of the second embodiment when the cover body 2 and the main body 7 of the notebook computer 1 opens from 0 degree to 360 degree is explained briefly with reference to FIG. 7. And vice versa, thus the explanation is omitted herein.

In a close status that the cover body 2 and the main body 7 of the notebook computer 1 close, an active force for open is applied to the cover body 2, the first rotating center axis 10 connected with the cover body 2 is applied the active force to start to rotate, as shown in FIG. 6, and a moment of which size T1 is generated. At this time, only the first rotating center axis 10 rotates, and the second rotating center axis 20 does not rotate.

When the cover body 2 and the main body 7 of the notebook computer 1 rotate to open to approximate 90 degree, the first rotating center axis 10 rotates to approximate 90 degree, the convex part of the cam 14 of the first rotating center axis 10 is into the concave part of the cam locking part 13 and is locked therewith, as shown in FIG. 7, a transient moment reduction is generated. At this time, if an active force for open is further applied, the active force for open firstly reaches T2 before reaching T3, due to the lock of the cam 14 of the first rotating center axis 10 with the cam locking part 13, the first rotating center axis 10 is made to stop rotation, and the active force to open acted on the first rotating center axis 10 brings the bracket plate 30 to rotate with respect to the second rotating center axis 20. For the convenience of explanation, at this time, the second rotating center axis 20 is also regarded as rotating with respect to the bracket plate 30.

When the cover body 2 and the main body 7 of the notebook computer 1 rotate to open to 270 degree, the second rotating center axis 20 rotates 180 degree with respect to the bracket plate 30, the stop part 21 of the second rotating center axis 20 and the blocker 34 of the bracket plate 30 joint against and restrict the further rotation of the second rotating center axis 20. At this time, an active force to open which is larger than T2 is applied for a further open, when the active force reaches T3, the convex part of the cam 14 of the first rotating center axis 10 is made to release from the concave part of the cam locking part 13 and the lock is released, the first rotating center axis 10 is made to start to rotate, as shown in FIG. 7, a moment T3 is generated when the convex part of the cam 14 is released from the concave part of the cam locking part 13, thereafter, it restores to the constant moment T1 required for the rotation of the first rotating center axis 10.

Next, when the first rotating center axis 10 rotates 90 degree, the stop part 11 of the first rotating center axis 10 and the blocker 33 joint against to restrict a further rotation of the first rotating center axis 10. At this time, the cover body 2 and the main body 7 of the notebook computer 1 open to 360 degree and become a folded status, the open motion is complete.

The hinge device 9 of the second embodiment can implement a stable and smooth 360 degree open-close motion by making the first and the second rotating center axis rotate with respect to bracket plate in turn. Further, similar to the first embodiment, it can implement a self-locking function when the notebook computer opens to 270 degree and can give a click sense.

Figure 9:
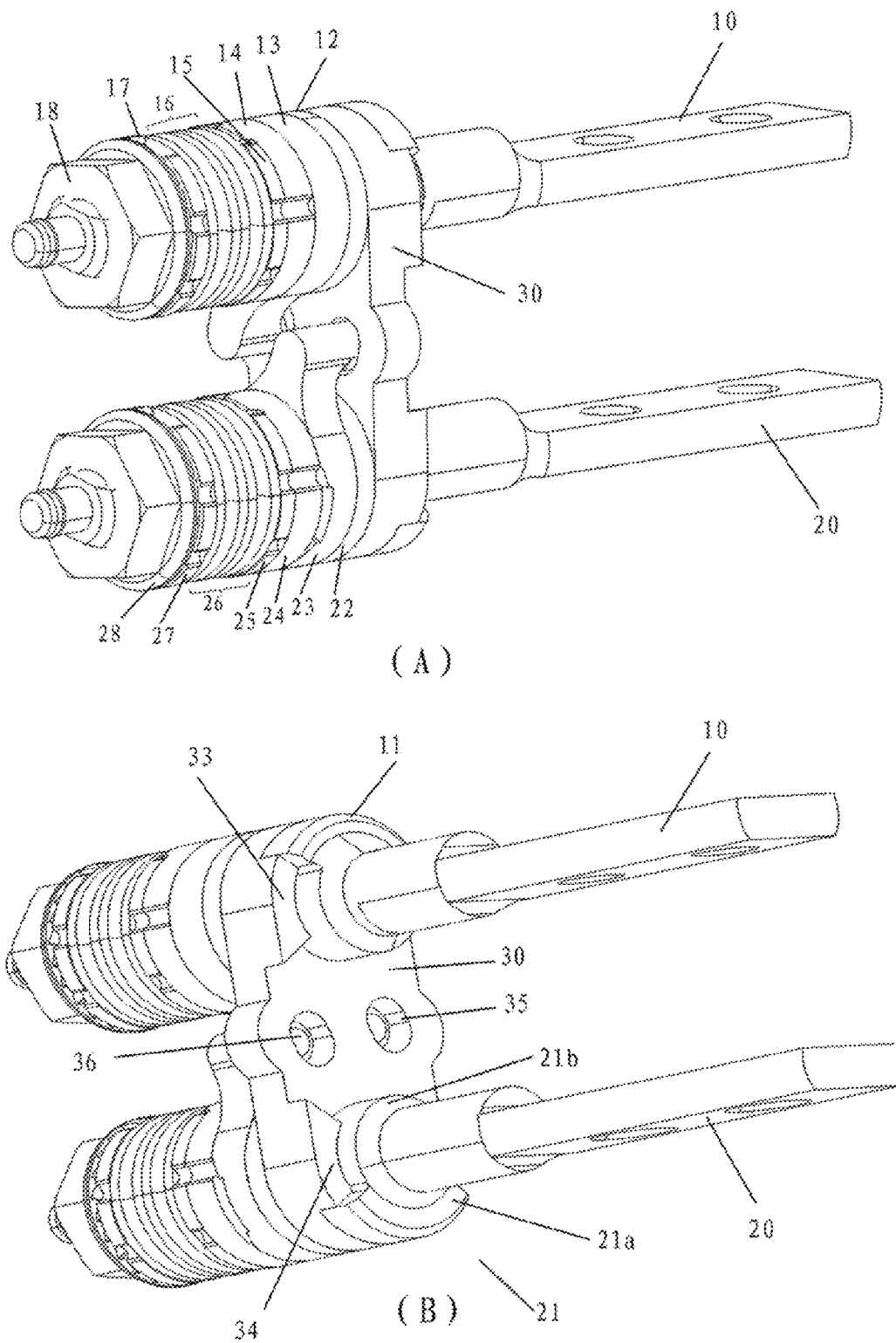
FIGS. 9(A), (B) are the schematic drawings of the configuration of the hinge device of the third embodiment of the invention.
Figure 10:
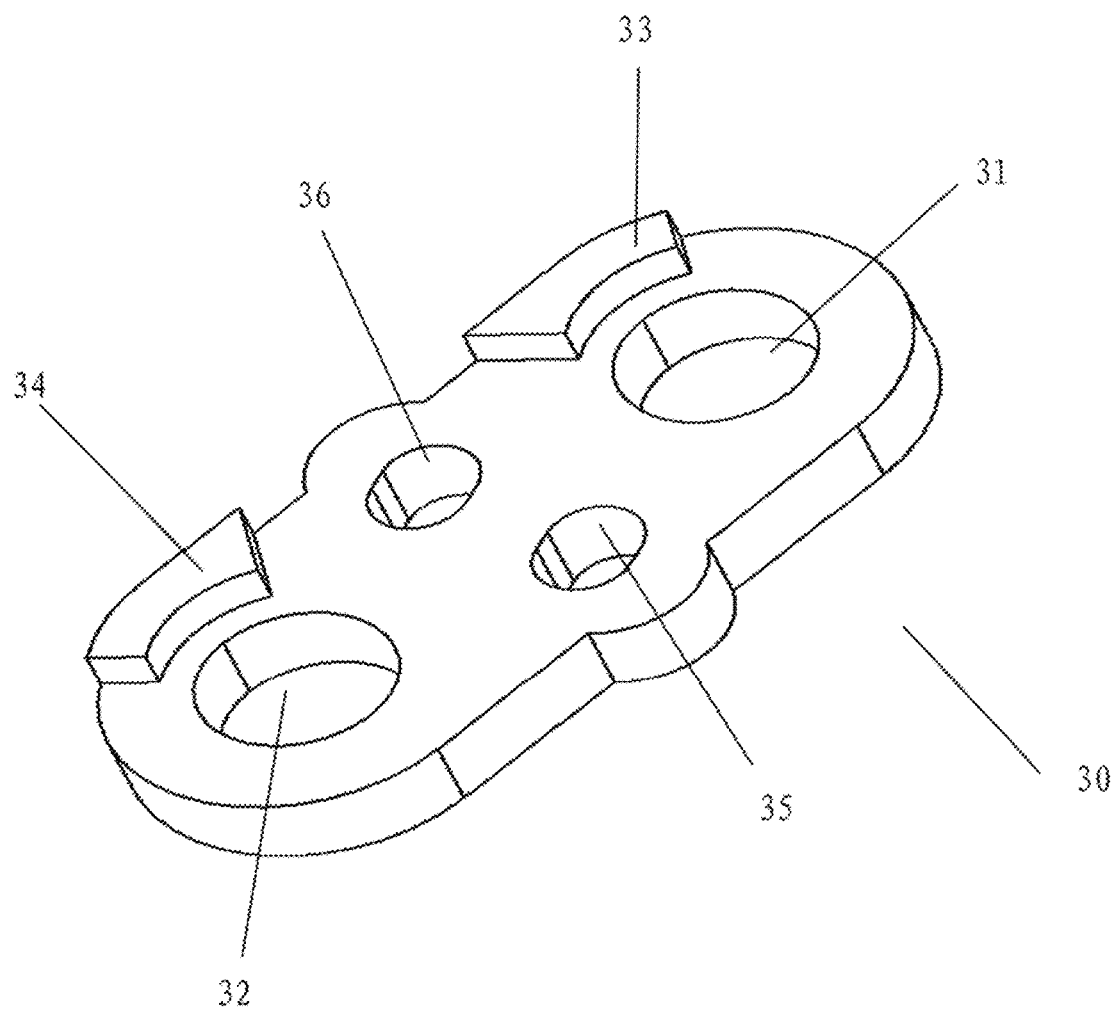
FIG. 10 is a drawing of the configuration of the blocker on the bracket plate of the hinge device of the third embodiment of the invention.

Hereinafter, the hinge device of the third embodiment of the invention is explained with reference to FIG. 9 and FIG. 10. FIG. 9 is a schematic view of the configuration of the hinge device of the third embodiment of the invention, FIG. 10 is a drawing of the configuration of the blocker on the bracket plate of the hinge device of the third embodiment of the invention.

The difference of the hinge device of the third embodiment from the hinge device of the second embodiment is that a cam locking part 23 and a cam 24 are provided on the second rotating center axis 20, and a fixing hole 36 for fixing the cam locking part 23 is provided on the bracket plate 30. Further, the lock configuration of the cam 14 of the first rotating center axis 10 and the cam locking part 13 and the provided positions of the blockers 34, 35 of the bracket plate 30 are different from those of the second embodiment. Other structures are substantially the same as the hinge device of the second embodiment, a same reference number is given to a same member and the detailed explanation is omitted.

On the second rotating center axis 20, a gasket 22, a cam locking part 23, a cam 24, a gasket 25, a plurality of reeds 26, . . . , a gasket 27 and a fasten nut 28 are inserted in order from the side of the bracket plate 30 on the second rotating center axis 20, and a stop part 21 is provided on the other side of the bracket plate. The stop part 21 is compose of a axis part 21*b* with approximately cylinder shape and a head part 21*a* with approximately sector shape having a periphery larger than that of the axis part 21*b*.

The cam 24 rotates integrated with the second rotating center axis 20 and is fixed with respect to second rotating center axis 20. The cam 24 is provided with a convex part protruding in the direction of the rotating center axis on a side opposite to the cam locking part 23, the cam locking part 23 is provided with a concave part locked with the convex part of the cam 24 depressed in the direction of the rotating center axis on a side opposite to the cam 24, and, a protrusion part 23*a* protruding toward the bracket plate 30 is provided extended on one end of the cam locking part 23, the cam locking part 23 is fixed with respect to the bracket plate 30 by inserting the protrusion part 23*a* into a fixing hole 36 provided on the bracket plate 30, and it is made to rotate in relative to the cam 24.

The cam 14 and the cam locking part 13 of the first rotating center axis 10 are set in a manner of being locked with each other when they start to rotate 180 degree with each other from an initial status, the cam 24 and the cam locking part 23 of the second rotating center axis 20 is set with an initial status of being locked with each other. The moments required for the convex parts of the cam 14, 24 releasing from the concave parts of the cam locking part 13, 21 are all set to T3.

The constant moment of the first rotating center axis 10 is set to T1, the constant moment of the second rotating center axis 20 is set to T2, herein, it sets T1=T2<T3.

As shown in FIG. 10, a blocker 33 is provided on one end of the bracket plate 30 in adjacent to the via hole 31, a blocker 34 is provided on one end of the bracket plate 30 in adjacent to the via hole 32, and the provided positions of the blocker 33 and blocker 34 are in a 180 degree angle, i.e., they are arranged in a line.

Figure 11:
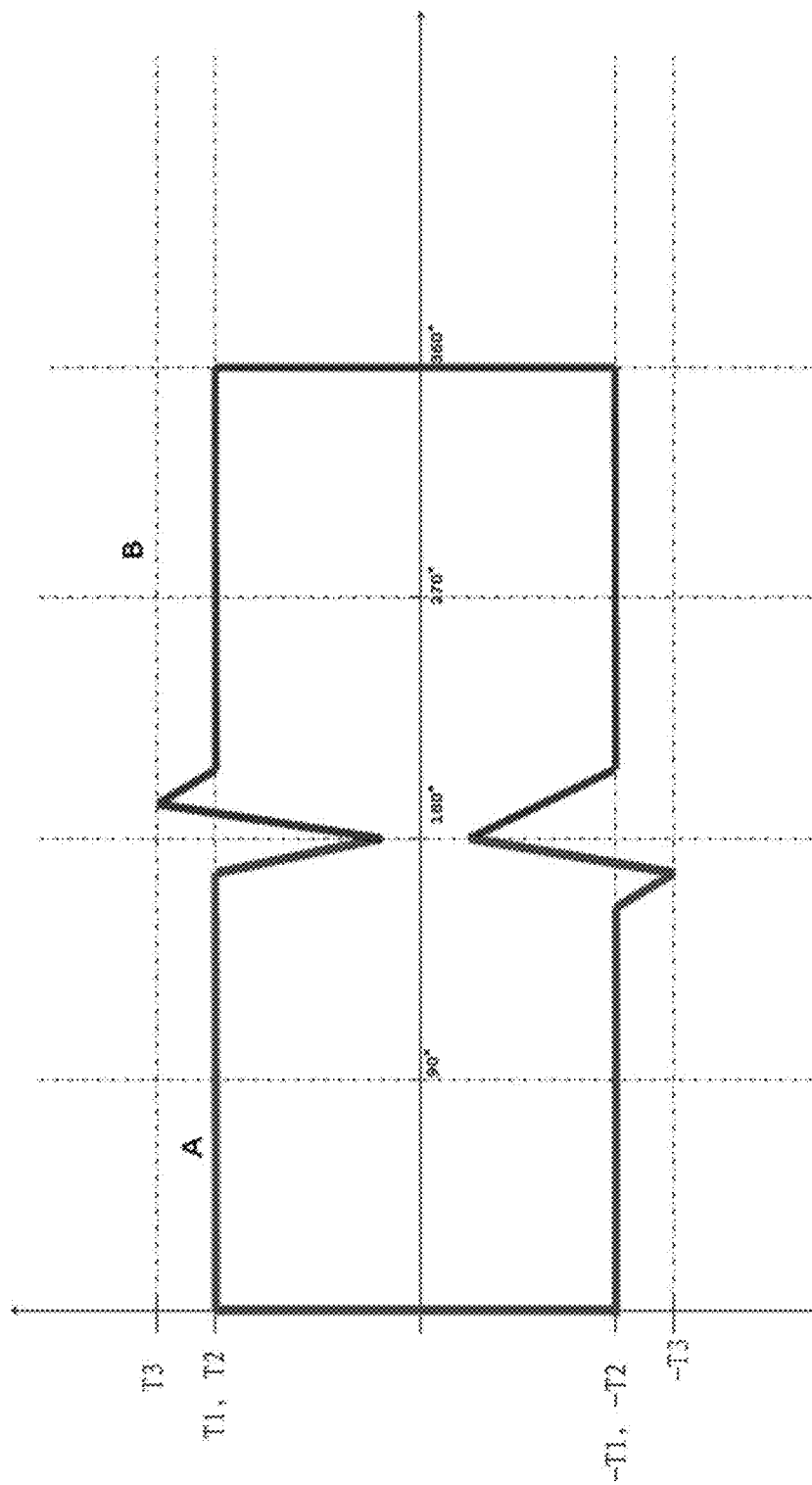
FIG. 11 is a graph of moment generated by the motion of the hinge device of the third embodiment of the invention.

FIG. 11 is a graph of moment generated by the motion of the hinge device of the third embodiment of the invention. Hereinafter, a motion of the hinge device of the third embodiment when the cover body 2 and the main body 7 of the notebook computer 1 open from 0 degree to 360 degree is explained briefly with reference to FIG. 11. And vice versa, thus the explanation is omitted herein.

In a close status that the cover body 2 and the main body 7 of the notebook computer 1 close, an active force to open is applied to the cover body 2, the first rotating center axis 10 connected with the cover body 2 is applied with the active force to start to rotate, and a moment of which size T1 is generated. The active force to open only makes the first rotating center axis 10 to rotate, and the second rotating center axis 20 does not rotate.

Next, when the first rotating center axis 10 rotates to approximate 180 degree, the convex part of the cam 14 is into the concave part of the cam locking part 13 and is locked therewith, a transient moment reduction is generated. At the same time, the stop part 11 of the first rotating center axis 10 and the blocker 33 of the bracket plate 30 joint against, so as to restrict a further rotation of the first rotating center axis 10. At this time, if an active force to open is further applied, the bracket plate 30 is brought to rotate with respect to the second rotating center axis 20. Herein, for the convenience of explanation, the second rotating center axis 20 is regarded as rotating with respect to the bracket plate 30.

When the second rotating center axis 20 starts to rotate with respect to the bracket plate 30, since the convex part of the cam 24 is locked with the concave part of the cam locking part 23 in the initial status, a moment T3 is generated for releasing the lock, and a constant moment T2 of the second rotating center axis is maintained after the convex part of the cam 23 is released from the concave part of the cam locking part 22.

Next, when the second rotating center axis 20 rotates 180 degree with respect to the bracket plate 20, the stop part 210 thereof and the blocker 34 joint against so as to restrict a further rotation thereof. At this time, the cover body 2 and the main body 7 of the notebook computer 1 rotate to open to 360 degree and become a folded status, the open motion is complete.

The hinge device 8 of the third embodiment of the invention can implement a stable and smooth 360 degree open-close motion by providing stop parts on the first and the second rotating center axis, providing blockers corresponding therewith on the bracket plate and making the first and the second rotating center axes rotate with respect to the bracket plate in order. Further, since the cam 14 and the cam locking part 13 locked as rotating 180 degree from the initial status are provided on the first rotating center axis 10, the cam 24 and the cam locking part 23 locked in the initial status are provided on the second rotating center axis, and it is made T3>T2=T1, it can implement a self-locking function when the notebook computer opens to 180° and gives a click sense.

Figure 12:
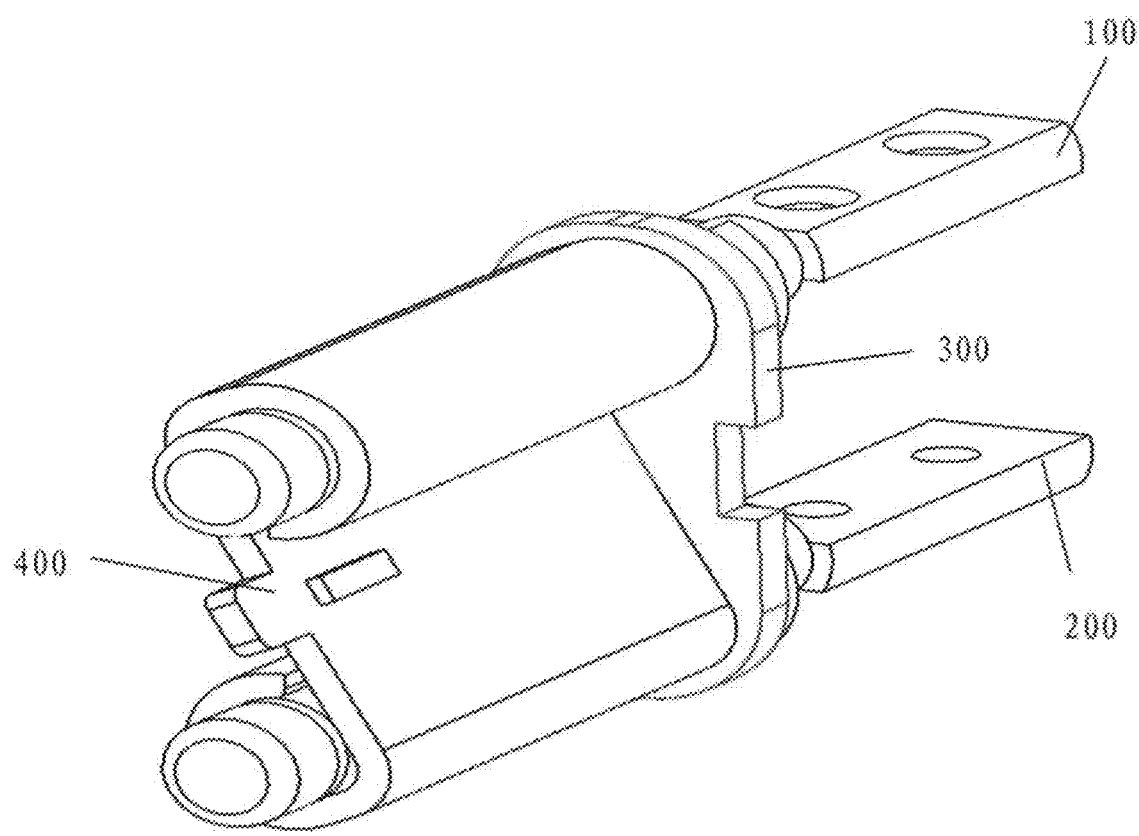
FIG. 12 is a stereogram of the status of the hinge device of the fourth embodiment of the invention with the casing removed.
Figure 13:
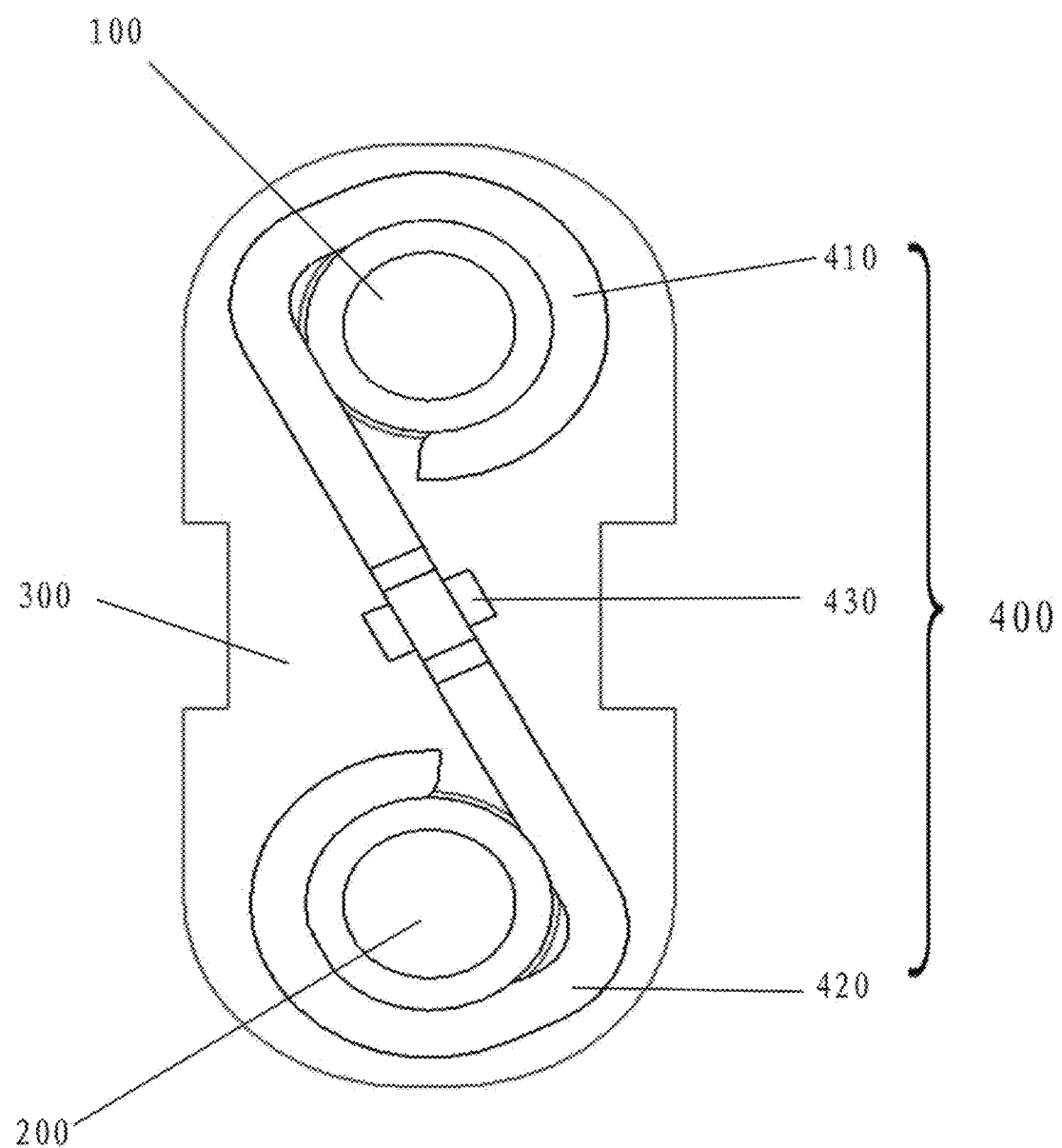
FIG. 13 is a side view of the hinge device of the fourth embodiment of the invention.
Figure 14:
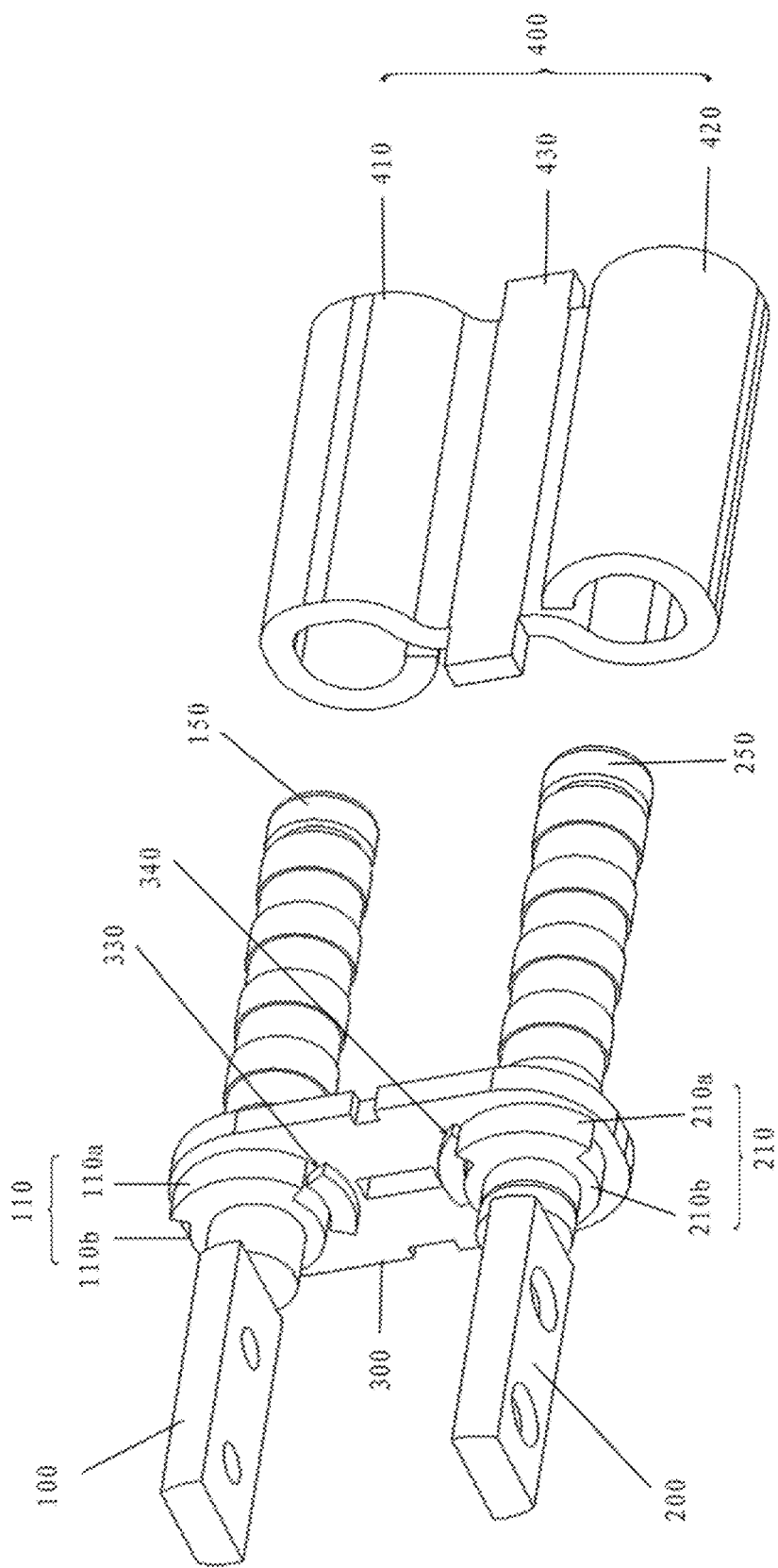
FIG. 14 is an exploded view for explaining the configuration of the hinge device of the fourth embodiment of the invention.
Figure 15:
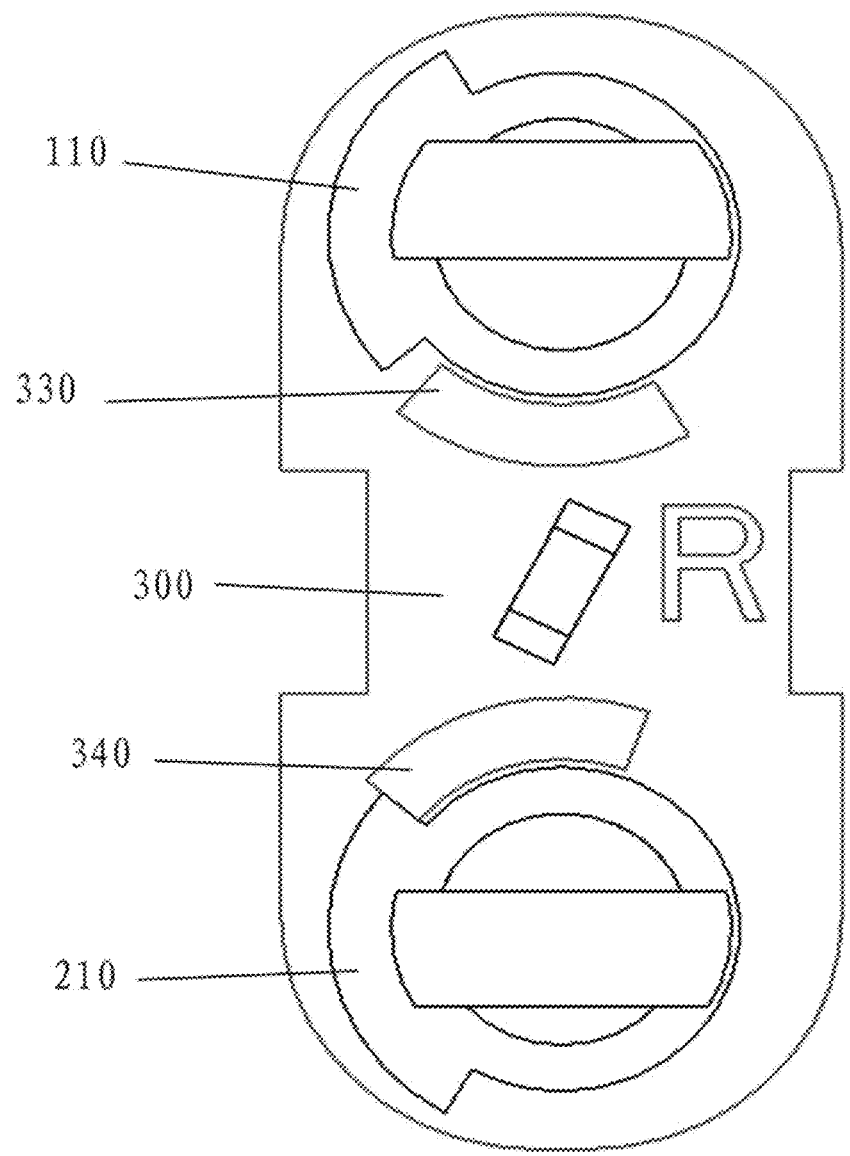
FIG. 15 is a drawing of the configuration of the blocker on the bracket plate of the hinge device of the fourth embodiment of the invention.

Hereinafter, a hinge device of the fourth embodiment of the invention is explained with reference to FIGS. 13 to 15. FIG. 12 is a stereogram of the hinge device of the fourth embodiment of the invention with casing detached, FIG. 13 is a side view of the hinge device of the fourth embodiment of the invention, FIG. 14 is an exploded view for explaining the configuration of the hinge device of the fourth embodiment of the invention, FIG. 14 is a drawing of the configuration of the blocker on the bracket plate of the hinge device of the fourth embodiment of the invention.

The hinge device 90 of the fourth embodiment is configured as a bi-axis hinge device, it has a first rotating center axis 100, a second rotating center axis 200, a bracket plate 300 axially supporting the first and the second rotating center axes 100, 200 and making them parallel with one another, a wrapping member 400 and a shell not illustrated.

The first rotating center axis 100 has a stop part 110 and a rotating axis center 150, the stop part 110 is composed of an axis part 110*b* of approximately cylinder shape and a header part 110*a* of approximately sector shape having a periphery larger than that of the axis part 110*b*.

The second rotating center axis 200 has a stop part 210 and a rotating axis center 250, the stop part 210 is composed of an axis part 220*b* of approximately cylinder shape and a header part 220*a* of approximately sector shape having a periphery larger than that of the axis part 220*b*.

The bracket plate 300 is made of a rigid material, via holes 310 and 320 are provided thereon, the first and the second rotating center axes are fixed on the bracket plate 300 by inserting the first and the second rotating center axes 100 and 200 into the via holes 310 and 320, and they can rotate freely. Further, blockers 330 and 340 are provided on the bracket plate 300 to joint against the stop parts 110 and 210. The blocker 330 is provided on one end of the bracket plate 300 in adjacent to the via hole 310, the blocker 340 is provided on one end of the bracket plate 300 in adjacent to the via hole 320, and the blocker 330 and the blocker 340 are provided oppositely and have a shortest distance therebetween.

The wrapping member 400 has a first axis sleeve 410 inserting through the rotating axis center 150 of the first rotating center axis 100, a second axis sleeve 420 inserting through the rotating axis center 250 of the second rotating center axis 200, and a connecting part 430 for connecting the first and the second axis sleeves. The first rotating center axis 100 and the second rotating center axis 200 are assembled in the wrapping member 400 in a manner of having a difference of rotary angle of 180 degree.

As shown in the figure, the first and the second axis sleeves 410 and 420 have opening parts to form a non-closed ring shape, respectively, the opening part of the first axis sleeve 410 and the opening part of the second axis sleeve 420 are positioned on opposite sides of the connecting part 430 to form the wrapping member 400 to an "S" shape. The first axis sleeve 410, the second axis sleeve 420, and the connecting part 430 can be integrated, and can be formed separately.

The stop parts 110 and 210 of the first and the second rotating center axes 110 and 200 and the wrapping member 400 are provided on the two sides of the bracket plate 300 in a manner of sandwiching the bracket plate 300, respectively.

In such configured hinge device 90, the first rotating center axis 100 is connected with the cover body 2 of the notebook computer 1 and is fixed, the second rotating center axis 200 is connected with the main body 7 and is fixed. Therefore, with the rotary motion in the direction of open-close of the cover body 2 and the main body 7, the first rotating center axis 100 and the second rotating center axis 200 rotate.

Figure 16:
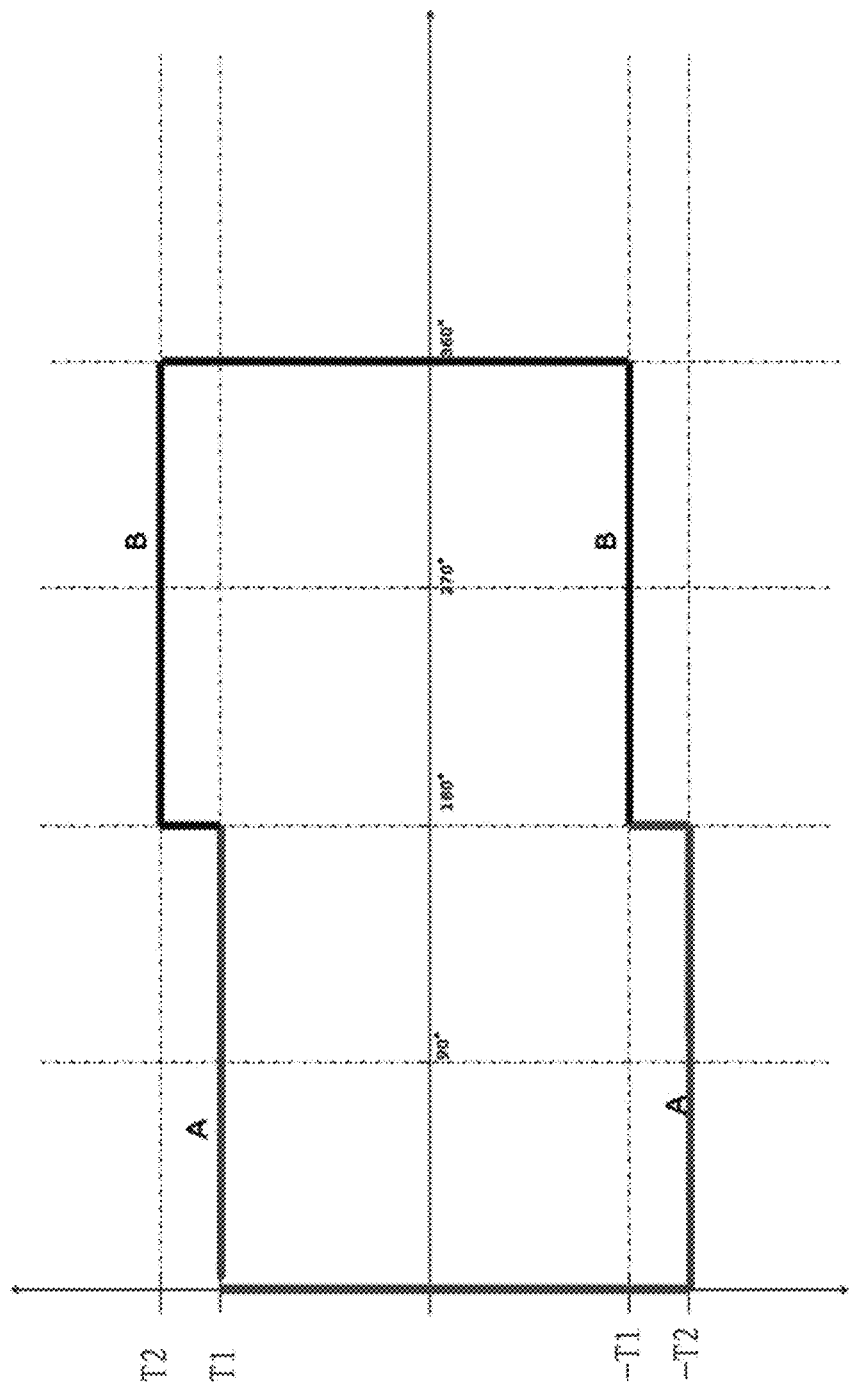
FIG. 16 is a graph of moment generated by the motion of the hinge device of the fourth embodiment of the invention.

FIG. 16 is a graph for explaining a moment generated by the motion of the hinge device of the fourth embodiment of the invention, hereinafter, the motion of the hinge device of the fourth embodiment when the cover body 2 and the main body 7 of the notebook computer 1 open from 0 degree to 360 degree is explained with reference to FIG. 16. And vice versa, thus the explanation is omitted herein.

In a close status that the cover body 2 and the main body 7 of the notebook computer 1 close, when an active force for open is applied to the cover body 2, the first rotating center axis 100 connected with the cover body 2 starts to rotate, the rotating axis center 150 thereof rotates clockwise with respect to the first axis sleeve 410, the opening part of the first axis sleeve 410 is expanded by using the friction of the rotating axis center 150 with respect to the first axis sleeve 410, so as to make the first rotating center axis 100 to generate a less moment T1. On the other hand, according to the right hand theorem, the gap between the second axis sleeve 420 and the rotating axis center 250 of the second rotating center axis 200 decreases, and the moment of the second rotating center axis is made to become larger. Therefore, at this time, only the first rotating center axis 100 rotates, and the second rotating center axis 200 does not rotate.

When the first rotating center axis 100 rotates to 180 degree, the stop part 110 thereof and the blocker 330 of the bracket plate 300 joint against so as to restrict a further rotation thereof. At this time, if an active force to open is further applied, the active force for open is applied to the first rotating center axis to bring the bracket plate 300 to rotate with respect to the second rotating center axis 200. For the convenience of explanation, at this time, it can be regarded as the second rotating center axis 200 starting to rotate with respect to the bracket plate 300. Since the second rotating center axis 200 is assembled in a relation of having a 180 degree difference of rotary angle with the first rotating center axis 100, the direction of rotation of the second rotating center axis 200 is reverse, by using the friction between the rotating axis center 250 of the second rotating center axis 200 and the second axis sleeve 420, the gap between the second axis sleeve 420 and the rotating axis center 250 of the second rotating center axis 200 decreases, so as to make the second rotating center axis 200 to generate a larger moment T2 (T2>T1).

When the second rotating center axis 200 rotates to 180 degree with respect to the bracket plate 300, the stop part 210 thereof and the blocker 340 joint against so as to restrict a further rotation thereof. At this time, the cover body 2 and the main body 7 of the notebook computer 1 rotate to open to 360 degree and become a folded status, the open motion is complete.

The hinge device 90 of the fourth embodiment can implement a stable and smooth 360 degree open-close motion by a simple structure by using the S-shape wrapping member 400. Further, by assembling the first rotating center axis 100 and the second rotating center axis 200 with a 180 degree difference of rotary angle, it can implement an open of 0 degree to 180 degree and a close of −360 degree to −180 degree with a lighter force, and implement an open of 180 degree to 360 degree and a close of −180 degree to 0 degree with a stronger force, which provides the user a different operational sense, and the user can grasp the operational status easily.

The Fifth Embodiment

Hereinafter, the hinge device of the fifth embodiment of the invention will be explained. The difference of the hinge device of the fifth embodiment from the hinge device of the fourth embodiment is that a first and a second cam locking parts and a first and a second cams are provided on the first and the second rotating center axes 100 and 200 respectively, a first and a second fixing holes for fixing the first and the second cam locking parts are provided on the bracket plate 300 respectively. Other structures are substantially the same as the hinge device of the fifth embodiment, a same reference number is given to a same member and the detailed explanation is omitted.

The first and the second cam rotate integrated with the first rotating center axis 100 and the second rotating center axis 200 respectively so as to be fixed, a first and a second convex parts protruding in the direction of the rotating center axis are provided on respective sides in opposite to the first and the second cam locking parts, concave parts locked with the convex parts of the first and the second cam respectively depressed in the direction of the rotating center axes are provided on respective sides in opposite to the first and the second cams of the first and the second cam locking parts, and, a first and a second protrusion parts protruding to the bracket plate 300 are provided extended on one end of the first and the second cam locking parts respectively, the first and the second cam locking parts are fixed with respect to the bracket plate 300 by inserting the first and the second protrusion parts into the first and the second fixing holes provided on the bracket plate 300 respectively and they are made to rotate in relative to the first and the second cams.

The first cam and the first cam locking part are provided in an initial status of being locked with each other, the second cam and the second cam locking part are provided in a manner of being locked with each other as rotating 180 degree with respect to each other from the initial status. The moments required for the convex parts of the first and the second cams releasing from the concave parts of the first and the second cam locking parts are set to T3.

Figure 17:
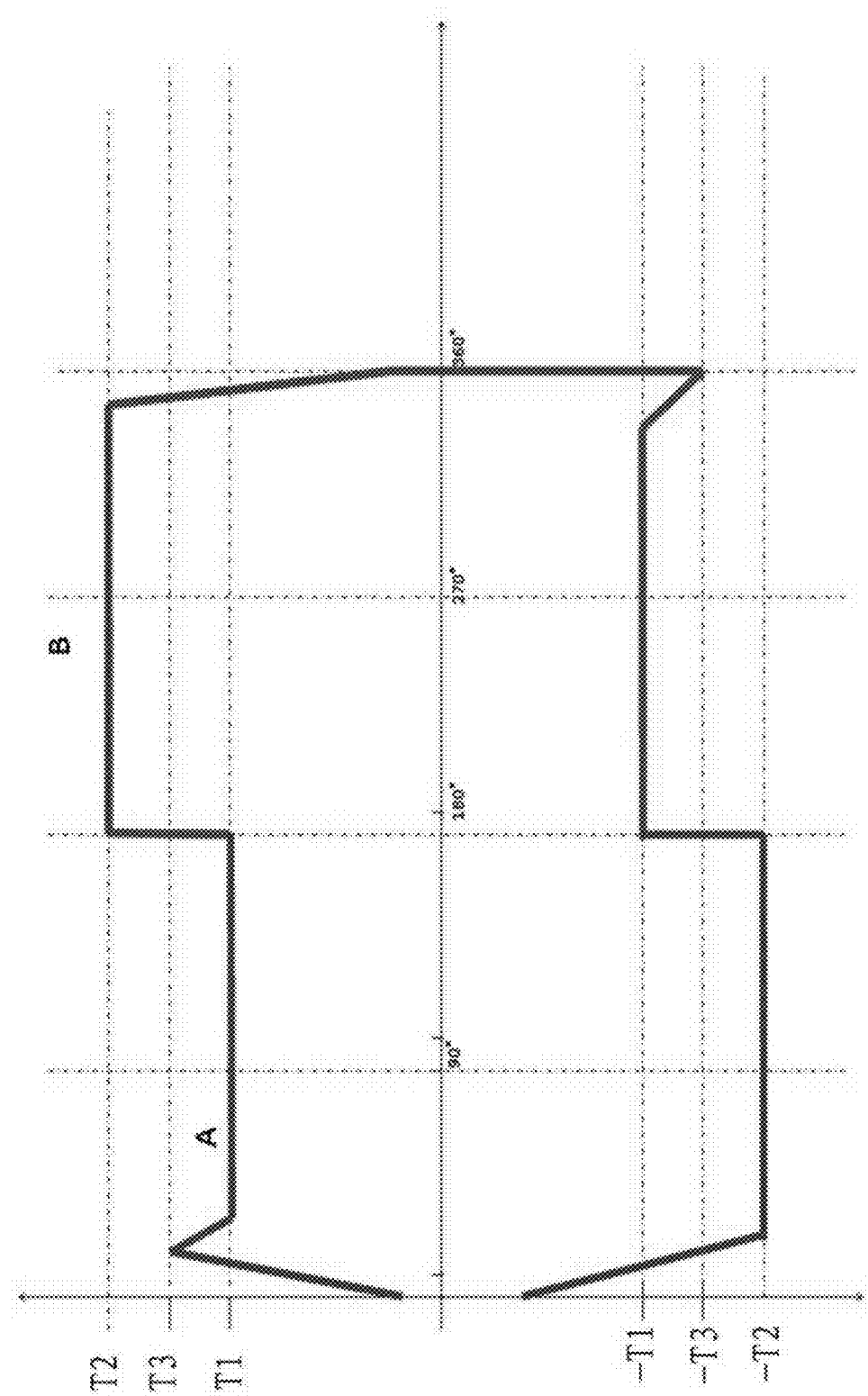
FIG. 17 is a graph of moment generated by the motion of the hinge device of the fifth embodiment of the invention.

FIG. 17 is a graph for explaining a moment generated by the motion of the hinge device of the fifth embodiment of the invention, hereinafter, the motion of the hinge device of the fifth embodiment when the cover body 2 and the main body 7 of the notebook computer 1 open from 0 degree to 360 degree is explained with reference to FIG. 17, and vice versa, thus the explanation is omitted herein.

In a close status that the cover body 2 and the main body 7 of the notebook computer 1 close, when an active force for open is applied to the cover body 2, the first rotating center axis 100 connected with the cover body 2 starts to rotate, in order for the convex part of the first cam releasing from the concave part of the first cam locking part to generate the moment T3, after the first cam releasing the lock with the first cam locking part, similar to the above fourth embodiment, a less moment T1 is generated, and only the first rotating center axis 100 rotates, and the second rotating center axis 200 does not rotate.

When the first rotating center axis 100 rotates for 180 degree, the stop part 110 thereof and the blocker 330 of the bracket plate 300 joint against so as to restrict a further rotation thereof. At this time, if an active force for open is further applied, the active force to open, acted on the first rotating center axis 100, brings the bracket plate 300 to rotate with respect to the second rotating center axis 200. For the convenience of explanation, at this time, the second rotating center axis 200 is regarded as starting to rotate with respect to the bracket plate 300, and similar to the above fourth embodiment, a larger moment T2 is generated.

When the second rotating center axis 200 rotates to approximate 180 degree, the convex part of the second cam thereof is into the concave part of the second cam locking part to be locked therewith, a transient torsion reduction is generated. As rotating to 180 degree, the stop part 210 of the second rotating center axis 200 and the blocker 340 of the bracket plate 300 joint against so as to restrict a further rotation thereof. At this time, the cover body 2 and the main body 7 of the notebook computer 1 open to 360 degree and become a folded status, the open motion is complete.

Hereinbefore, the preferred embodiment of the present invention is explained, it is obvious that the invention is not limited to the aforesaid embodiment, a proper combination and alteration can be made to the aforesaid embodiment without departing from the inventive purpose of the invention.

In the aforesaid embodiments, the constitute elements of the hinge device are made of metallic component, but it is not limited to this, it can be composed of other proper material such as a shape forming member made of resin component or the like. And, the bracket plate is preferably formed of a material with a strong rigidity and non-deformable, and it can be formed of metallic component with slightly curving elastic distortion.

Further, in the invention, the configuration and the numbers of the convex parts of the cam and the concave parts of the cam locking part can be configured for other structures, for example, a midway halted status such as 160 degree open status or the like, in addition to a completely close status, a completely open status, 90 degree, 180 degree, and 270 degree status. Thereof, it can halt the open-close angle of the notebook computer 1 with a user friendly angle, which can improve the convenience.

Further, in aforesaid embodiment, a cam or a wrapping member is provided, but it can be a structure without the cam and the wrapping member.

Further, in aforesaid embodiment, the cam locking part is fixed with respect to the bracket plate by inserting the convex part of the cam locking part into the fixing hole of the bracket plate, other fix means can be adopted, such as welding, integrated shaping or the like.

Further, in aforesaid embodiment, the relation among the first and the second rotating center axes and the size of the moment of the cam releasing lock is explained, the invention is not limited thereto, so long as the first and the second rotating center axis are made to move in order to implement a 360 degree open-close, it can be set arbitrarily as need.

Further, in aforesaid embodiment, the provided position of the blocker is explained, the invention is not limited thereto, so long as the first and the second rotating center axis are moved in order to implement a 360 degree open-close, it can be set arbitrarily as need.

Further, in aforesaid embodiment, the first rotating center axis rotates clockwise when the hinge device with an S-shape wrapping member operates for open is explained, the invention is not limited thereto, it can rotate counter-clockwise.

Further, in aforesaid embodiment, an example of applying force to the cover body 2 as the open and close operation is explained, the force can be applied to the main body 7.

As above mentioned, in order to implement a diverse usage form of the portable electronic device, such as notebook computer and mobile phone, a bi-axis hinge device is proposed. Such bi-axis hinge device comprises a hinge bracket and two axes of two parallel axis sleeves inserted to be formed on the hinge bracket respectively. And, such parallel bi-axis hinge device can provide a 360 degree rotation for the notebook computer so as to implement a clam-shell form, a supporting form (the rotary angle is larger than 180 degree and less than 360 degree, so that the base portion and the screen portion of the notebook computer support each other to stand on the desk in a triangular shape) and a flat panel (pad) form.

In such a bi-axis hinge device, in order to control the rotary order of the two axes, different friction torques are configured for the two axes, so that the axis with a smaller torque rotates firstly when it starts to rotate, and the axis with a larger torque does not rotate, and when a larger force is applied when the axis with a smaller torque rotates to a maximum angle, the axis with a larger torque starts to rotate. That is, when the user rotates the screen portion of the notebook computer from 0 degree to 180 degree, it needs to apply a smaller force, and when the user rotates the screen portion from 180 degree to 360 degree, it needs to apply a larger force.

However, such design has many defects. For example, when the screen is opened from 0 degree to 360 degree, the axis with a smaller torque rotates firstly, and then the axis with a larger torque rotates, when the screen is closed from 360 degree to 0 degree, the axis with a smaller torque also rotates firstly and then the axis with a larger torque rotates. The rotary order is asymmetric. Further, for example, in order to ensure the rotary order, the difference of the torque of the two axes should be large enough, therefore, in the course of rotation from 0 degree to 360 degree or from 360 degree to 0 degree, the user needs to apply different forces to turn the screen of the notebook computer, the usage experience is poor. Further, for example, the torques are set as manufacturing the apparatus, and they will have certain attenuation with the time elapses, it may results in the disorder of the rotary order of the two axes, even out of use.

Generally, each notebook computer is mounted with two left and right hinges. For a mono-axis hinge, the notebook computer has two degrees of freedom, and for the bi-axis hinge, the degrees of freedom are doubled to four degrees of freedom. There may be differences in the set of the torques of each axis of the left bi-axis hinge and the right bi-axis hinge, therefore there may be a case that an axis rotates unexpectedly when the axis should not rotate, so that the rotary status of the left hinge and the right hinge may not be synchronized. Thus, it results in a distortion of the screen portion of the notebook computer with respect to the base portion and it influences usage.

Therefore, according to a further aspect of the invention, there provides a hinge device which can overcome one or more of the aforesaid and other problems.

The further aspect of the invention provides a folded apparatus with the hinge device. The folded apparatus can be a notebook computer. The notebook computer of the invention can implement a rotation with a predetermined order, and the course of rotation is smoother, and it can prevent the distortion between the screen portion and the base portion.

According to an exemplified embodiment of the invention, a hinge device comprises a hinge bracket, a first axis, and a second axis provided being parallel with each other and supported rotatably by the hinge bracket, the first axis is connected with a first body of an apparatus, and the second axis is connected with a second body of the apparatus, the first body can rotate from 0 degree to 360 degree and/or from 360 degree to 0 degree with respect to the body by being brought by the first axis and the second axis, wherein, when the first body rotates from 0 degree to a predetermined angle and/or from the predetermined angle to 0 degree with respect to the second body, the first axis rotates, and the second axis stops, and wherein, when the first body rotates from the predetermined angle to 360 degree and/or from 360 degree to the predetermined angle with respect to the second body, the second axis rotates, and the first axis stops.

According to an exemplified embodiment of the invention, a hinge device comprises a hinge bracket, a first axis, and a second axis provided being parallel with each other and supported rotatably by the hinge bracket, a first recess and a second recess are provided on the first axis and the second axis respectively, and a float locating member supported by the hinge bracket and being able to slide between the first axis and the second axis to couple to the first recess and/or the second recess.

According to an exemplified embodiment of the invention, a hinge device comprises a hinge bracket, a first axis, and a second axis provided being parallel with each other and supported rotatably by the hinge bracket; the first axis is connected with a first cam, the first cam is brought to rotate when the first axis rotates; the second axis is connected with a second cam, the second cam is brought to rotate when the second axis rotates; a first recess and a second recess are provided on the first cam and the second cam respectively; a locating cam member supported by the hinge bracket and being able to slide between the first cam and the second cam to be coupled to the first recess or the second recess.

According to an exemplified embodiment of the invention, a hinge device comprises a hinge bracket, a first axis, and a second axis provided being parallel with each other and supported rotatably by the hinge bracket, wherein, the first axis is connected with a first body, the second axis is connected with a second body, the first axis and the second axis interacts so that the first body rotates from 0 degree to 360 degree and from 360 degree to 0 degree with respect to the second body; a first recess and a second recess are provided on a partial circumference of a part of the first axis and the second axis respectively, a first protrusion and a second protrusion are provided on the first axis and the second axis respectively; a first stop part and a second stop part are provided on the hinge bracket; the first stop part and the first protrusion fit to make the first axis to bring the first body to rotate from 0 degree to 180 degree and from 180 degree to 0 degree with respect to the second body; the second stop part and the second protrusion fit to make the second axis to bring the first body to rotates from 180 degree to 360 degree and from 360 degree to 180 degree with respect to the second body; and a float locating member supported by the hinge bracket and being able to slide between the first axis and the second axis to be coupled to the first recess or the second recess.

According to an exemplified embodiment of the invention, a hinge device comprises a hinge bracket, a first axis, and a second axis provided being parallel with each other and supported rotatably by the hinge bracket, wherein the first axis is connected with a first body and the second axis is connected with a second body; the first axis and the second axis interacts to make the first body to be able to rotate from 0 degree to 360 degree and from 360 degree to 0 degree with respect to the second body; the first axis is connected with a first cam, the first cam is brought to rotate when the first axis rotates; the second axis is connected with a second cam, the second cam is brought to rotate when the second axis rotates; a first recess and a second recess are provided on the first cam and the second cam respectively; a locating cam member supported by the hinge bracket and being able to slide between the first cam and the second cam to be coupled to the first recess or the second recess; a first protrusion and a second protrusion are provided on the first cam and the second cam respectively, a first stop part and a second stop part are provided on the hinge bracket; the first stop part and the first protrusion fit to make the first axis to bring the first body to rotate from 0 degree to 180 degree and from 180 degree to 0 degree with respect to the second body; the second stop part and the second protrusion fit to make the second axis to bring the first body to rotate from 180 degree to 360 degree and from 360 degree to 180 degree with respect to the second body.

According to an exemplified embodiment of the invention, a folded apparatus comprises a first body, a second body, and at least one bi-axis hinge device connecting the first body to the second body, wherein, the bi-axis hinge device comprises a hinge bracket, a first axis, and a second axis provided being parallel with each other and supported rotatably by the hinge bracket, a first recess and a second recess are provided on the first axis and the second axis; and a float locating member supported by the hinge bracket and being able to slide between the first axis and the second axis to be coupled to the first recess or the second recess.

According to an exemplified embodiment of the invention, a folded apparatus comprises a first body, a second body, and at least one bi-axis hinge device connecting the first body to the second body, wherein, the bi-axis hinge device comprises a hinge bracket, a first axis, and a second axis provided parallel with each other and supported rotatably by the hinge bracket, wherein the first axis is connected with a first cam, the first cam is brought to rotate when the first axis rotates; the second axis is connected with a second cam, the second cam is brought to rotate when the second axis rotates; a first recess and a second recess are provided on the first cam and the second cam respectively; and locating cam member supported by the hinge bracket and being able to slide between the first cam and the second cam to be coupled to the first recess or the second recess.

In the folded apparatus of the invention such as notebook computer, since the float locating member restricts the rotary order of the axes of the hinge device, a substantially symmetric rotation when the screen is opened from 0 degree to 360 degree and is closed from 360 degree to 0 degree can be implemented to obtain a good user experience.

Further, the torques of the first axis and the second axis of the hinge device can be set to be substantially the same. Therefore, in the procedure of rotation for opening and closing the screen portion, it hardly experiences a change in the applied force. Therefore, the notebook computer of the invention can implement a more smooth rotation.

Further, since the first axis and the second axis of the hinge device are physically locked by the float locating member when they do not rotate, it prevents an unexpected rotation thereof. The four degrees of freedom (corresponding to four rotary axes) of the notebook computer mounted with for example two left and right hinge devices can reduce to two degrees of freedom by physically locking two axes, therefore, a relative distortion between the screen portion and the base portion can be reduced or eliminated.

Figure 18:
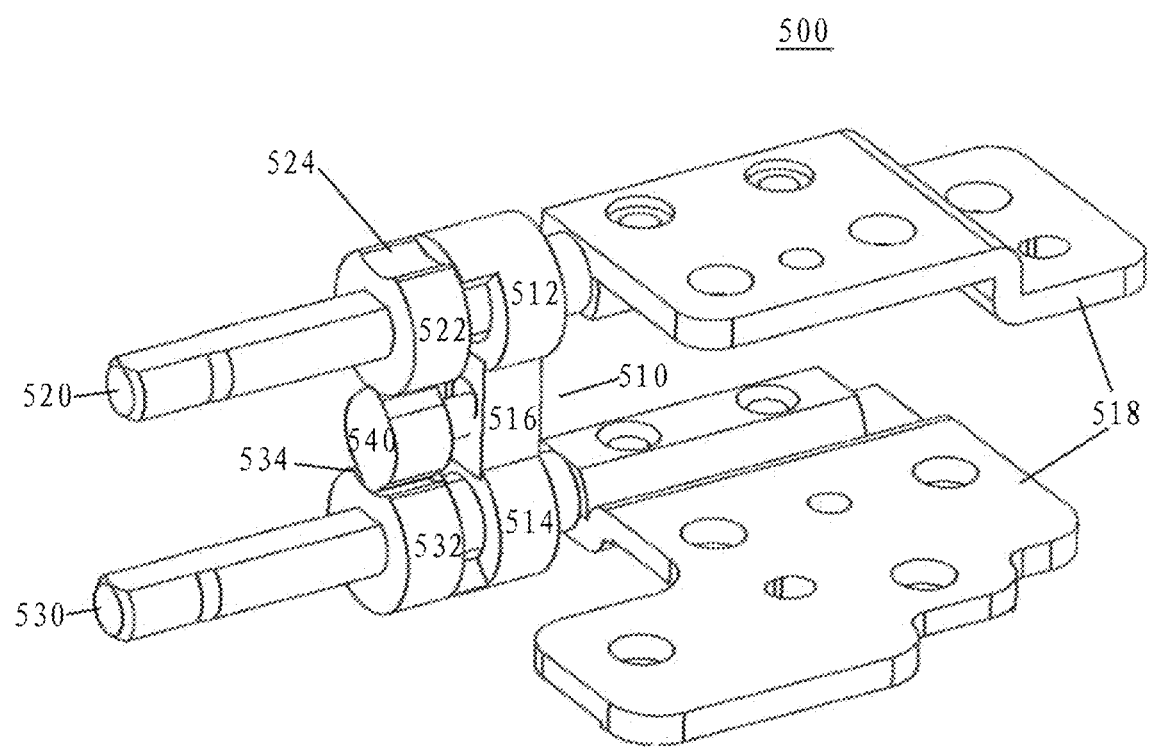
FIG. 18 is a perspective showing the hinge device according to the sixth embodiment of the invention.

FIG. 18 shows a bi-axis hinge device 500 according to the sixth embodiment of the invention. As shown in FIG. 18, the bi-axis hinge device 500 comprises a hinge bracket (corresponding to the bracket plate in the first to the fifth embodiment) 510, a first axis (corresponding to the first rotating center axis in the first to the fifth embodiment) 520, a second axis (corresponding to the second rotating center axis in the first to the fifth embodiment) 530 and a float locating member 540.

The hinge bracket 510 may have two axis sleeves 512 (a first axis sleeve) and 514 (a second axis sleeve) provided being parallel with each other and apart with a predetermined distance and a connecting portion 516 connecting the two axis sleeves 512 and 514. The first axis 520 and the second axis 530 can be inserted to the first axis sleeve 512 and the second axis sleeve 514 so as to be supported rotatably by the hinge bracket 510. A predetermined friction can be configured between the first axis 520 and the first axis sleeve 512 and between the second axis 530 and the second axis sleeve 514 so as to set torques of the first axis 520 and the second axis 530. The torque of the first axis 520 and the torque of the second axis 530 can be same as each other, and can be different from each other.

The first axis 520 and the second axis 530 can be inserted to the first axis sleeve 512 and the second axis sleeve 514 so as to be supported rotatably by the hinge bracket 510. Alternatively, a fix reinforcing plate 518 can be formed on the first axis 520 and the second axis 530, respectively so that the first axis 520 and the second axis 530 are connected to the component to be linked by the hinge by the reinforcement of the fix reinforcing plate 518, for example, the base portion and the display portion of the notebook computer, the keyboard portion, and the display portion of the mobile phone. The first axis 520 and the second axis 530 can connect directly to the component to be linked by the hinge without the fix reinforcing plate 518.

A recess is provided on the first axis 520. In the embodiment shown in FIG. 18, a first cam 522 may be formed on the first axis 520. The first cam 522 may have a substantially circular shape, and a first recess 524 may be formed on a partial circumference of the first cam 522. Similarly, a recess is provided on the second axis 530. In the embodiment shown in FIG. 18, a second cam 532 may be formed on the second axis 530. The second cam 532 may have a substantially circular shape, and the second recess 534 may be formed on a partial circumference of the second cam 532. The first cam 522 may be fixed with respect to the first axis 520, so that the rotation of the first axis 520 brings the first cam 522 to rotate. The second cam 532 may be fixed with respect to the second axis 530, so that the rotation of the second axis 530 brings the second cam 532 to rotate.

It should understand that the invention is not limited to the sixth embodiment shown in FIG. 18. For example, a part of each of the first axis 520 and the second axis 530 may have a circular cross section, and the first recess 524 and the second recess 534 can be formed directly on a partial circumference of the part of the first axis 520 and the second axis 530 respectively. It will be described detailed in the following exemplified embodiment.

The float locating member 540 is provided between the first axis 520 and the second axis 530, and is able to slide between the first axis 520 and the second axis 530 to be coupled to the first recess 524 or the second recess 534. The float locating member 540 can be a rigid body. In the exemplified embodiment shown in FIG. 18, the float locating member 540 is provided between the first cam 522 of the first axis 520 and the second cam 532 of the second axis 530. In the embodiment shown in FIG. 18, the float locating member 540 has a cam shape, so it may be called a locating cam member including a central part and two end parts, the two end parts can be coupled into the first recess 524 and the second recess 534, respectively. The locating cam member 540 can be formed integrated, or it can include the center part and the two end part formed separately. The first cam 522 and the second cam 532 can form a cam pair with the locating cam member 540 respectively, and the two end parts of the first cam 522, the second cam 532 and the locating cam member 540 coupled to the first recess 524 and the second recess 534 can be made of high-strength material to stand wear and tear.

The float locating member 540 supported slidably on the hinge bracket 510, for example but not limited to be supported on the connecting portion 516 of the hinge bracket 510. For example, a slit open or groove is formed on the connecting portion 516, the connecting axis of the float locating member 540 fits into the open or the groove. In the hinge device 500 as shown in FIG. 18, the cross section of the float locating member 540 is not a circular shape, it is preferably that it is supported slidably to the hinge bracket 510 and cannot rotate, the reason thereof is obvious from the following description. For example, the connecting axis connecting the float locating member 540 to the hinge bracket 510 can have a rectangle cross section.

Figure 21:
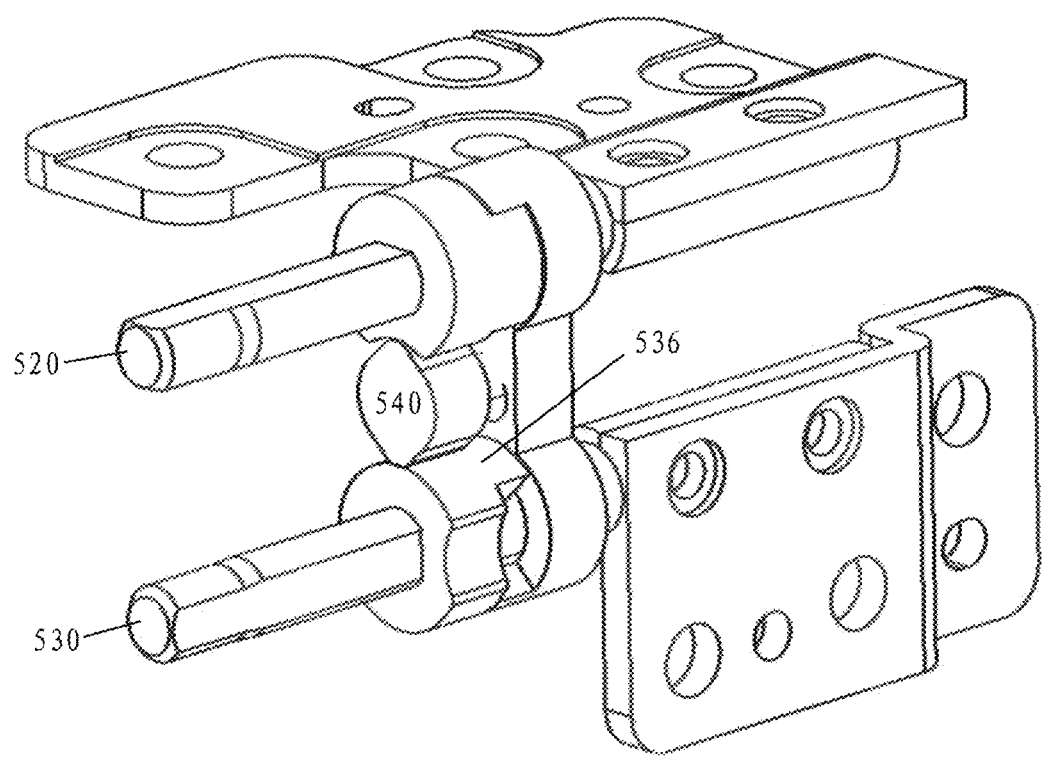

A first protrusion 526 is formed on the first axis 520 (see FIG. 19), and a second protrusion 536 is formed on the second axis 530 (see FIG. 21). The first protrusion 526 and the second protrusion 536 may be formed on the first cam 522 and the second cam 532 respectively, or may be formed directly on the first axis 520 and the second axis 530 respectively (not illustrated). Stop parts (hereinafter also called stop part) 519 corresponding to the first protrusion 526 and the second protrusion 536 are formed on the hinge bracket 510. The stop part 519 can fit with the first protrusion 526 and the second protrusion 536 to restrict the rotary angles of the first axis 520 and the second axis 530 with respect to the hinge bracket 510, e.g., restrict the first axis 520 to rotate predetermined angle with respect to the hinge bracket 510, restrict the second axis 530 to rotate a remaining angle by subtracting the predetermined angle from 360 degree with respect to the hinge bracket 510. That is, the first protrusion 526 and the stop part 519 fitted therewith extend the predetermined angle on a circumference with the center of the first axis 520 as center of circle, the second protrusion 536 and the stop part 519 fitted therewith extend the remaining angle on a circumference with the center of the second axis 530 as center of circle. It is known that the mono-axis hinge can generally implement a rotary angle larger than 180 degree, e.g., 225 degree or even more. Therefore, the predetermined angle described herein may be less than 180 degree, for example but not limited to 135 degree or even less, or larger than 180 degree, for example but not limited to 225 degree or even more. Preferably, the predetermined angle is 180 degree. For the convenience of description, the exemplified embodiment of the invention will be described by taking 180 degree as example as follow.

The procedure of rotation of the hinge device according to the sixth embodiment of the invention is described with reference to FIGS. 18 to 22 as follow.

As shown in FIG. 18, the hinge device 500 does not rotate and is in a 0 degree status. At this time, the float locating member 540 is pressed against the circumference part (i.e., non-recess part) of the first cam 522 to be coupled in the second recess 534.

Figure 19:
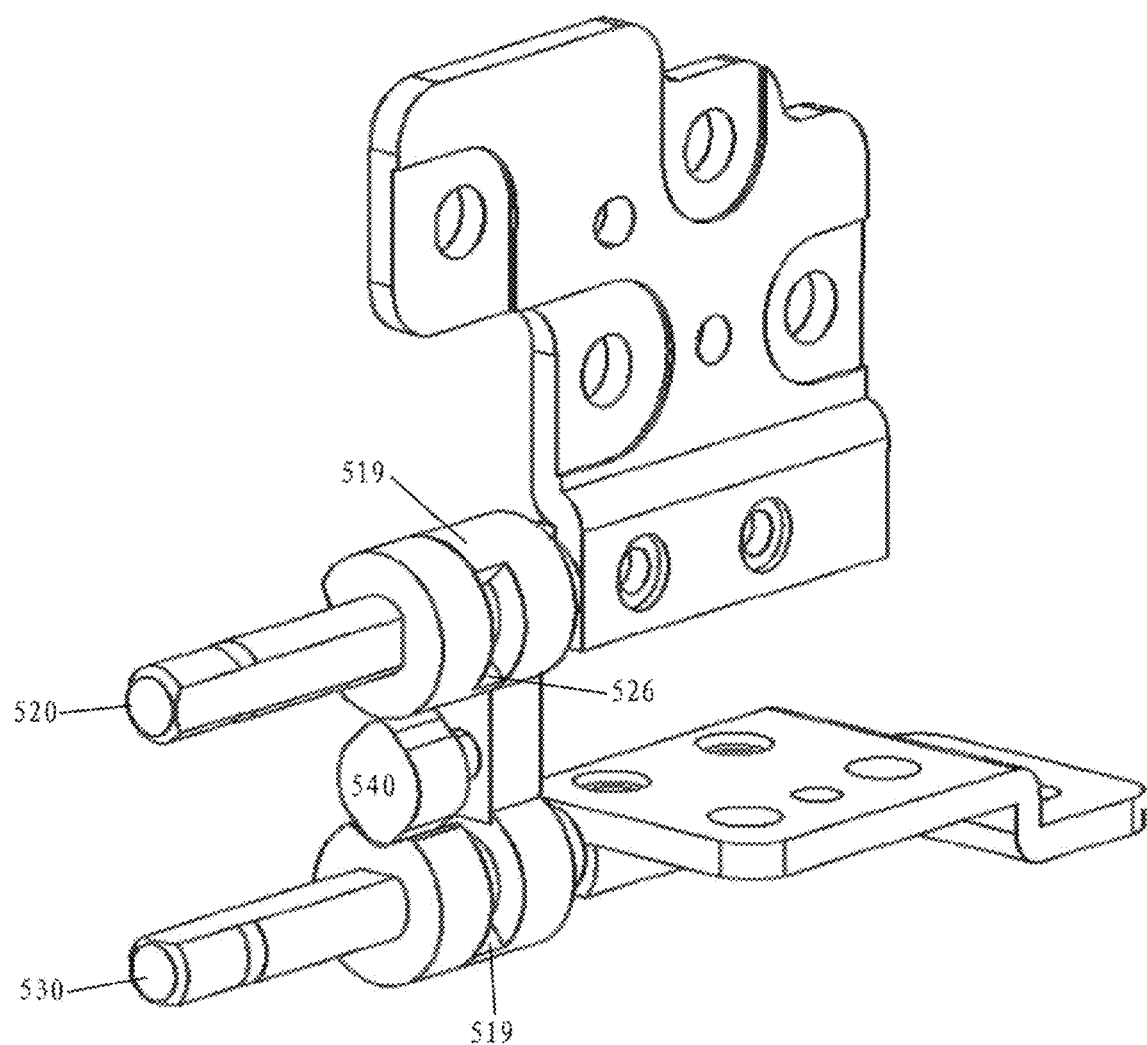
FIGS. 19 to 22 are perspectives showing the procedure of rotation of the hinge device shown in FIG. 18.

When the hinge device 500 starts to rotate to open, since the float locating member 540 is coupled in the second recess 534, the second axis 530 is physically locked and can not rotate, the first axis 520 can rotate, for example rotate counter-clockwise (taking the side view of the float locating member 540 as example). As shown in FIG. 19, the first axis 520 can rotate to 90 degree.

Figure 20:
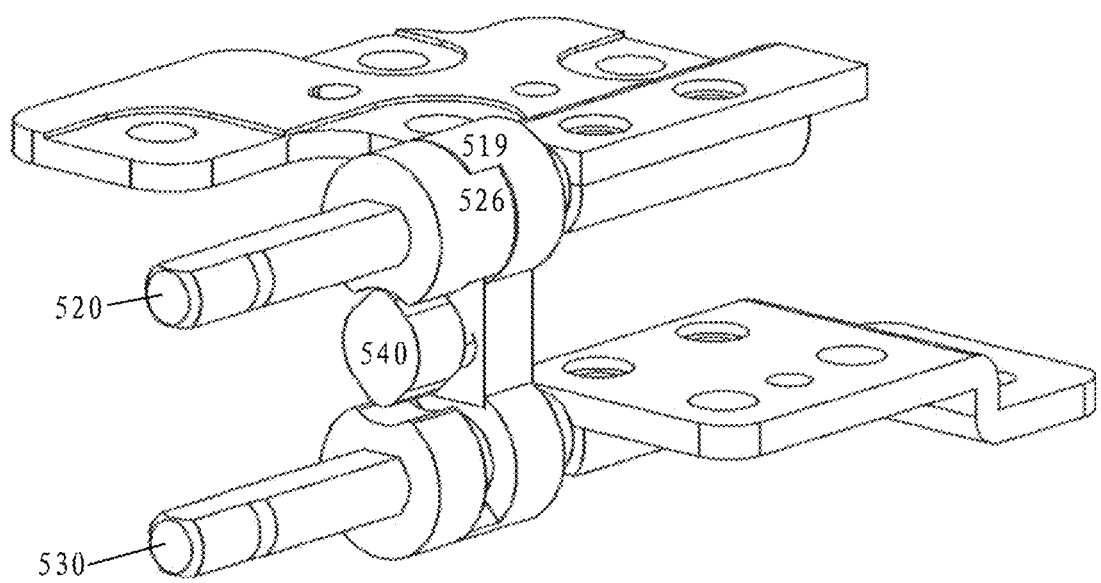

Next, the first axis 520 may continue to rotate, for example, rotate counter-clockwise until a predetermined angle. As above mentioned, the predetermined angle is preferably 180 degree, as shown in FIG. 20. When the first axis 520 rotates to the predetermined angle, the first recess 524 on the first axis 520 and the second recess 534 of the second axis face each other and are most approximate. At this time, the stop part 519 of the hinge bracket 510 blocks the first protrusion 526 on the first axis 520, so as to prevent the first axis 520 continue to rotate counter-clockwise with respect to the hinge bracket 510. And the second axis 530 is physically locked by the float locating member 540 so as to not able to rotate with respect to the hinge bracket 510.

In this case, in the continuous application of the external force, the first axis 520 brings the hinge bracket 510 with the trend of rotating counter-clockwise with respect to the second axis 530, in other words, the second axis 530 has a trend of rotating clockwise with respect to the hinge bracket 510. The cross section of the second recess 534 on the second axis 530 may have a slant side wall, e.g., an arc plane or a tapered plane, therefore, the force applied by the side wall of the second recess 534 on the second axis 530 to the float locating member 540 has a upward component (i.e., toward the first axis 20), and at this time, the upper end of the float locating member 540 is not pressed against by the circumference part of the first axis 520, so the float locating member 540 can move upward to be coupled into the first recess 524 on the first axis 520. Herein it is easy to understand that in order to ensure the upward movement of the float locating member 540, it is preferably that the float locating member 540 is not able to rotate, but the invention is not limited thereto.

Figure 23:
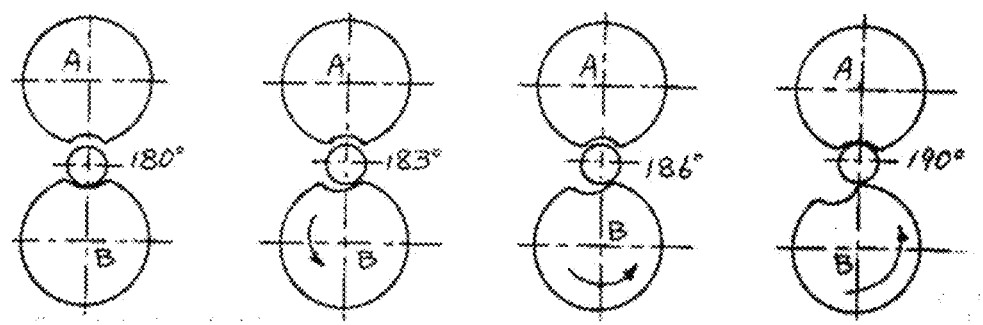
FIG. 23 is a side view showing a slide of a float locating member at a predetermined angle.

FIG. 23 shows the movement of the float locating member 540 detailed. Taking the predetermined angle as 180 degree as example, the float locating member 540 is coupled in the recess of the lower axis B at 180 degree. Since an upper axis A is blocked by the stop part and is not able to continue to rotate clockwise with respect to the hinge bracket 510 and the float locating member 540, the lower axis B has a trend of rotating counter-clockwise with respect to the float locating member 540. When the lower axis B starts to rotate, e.g., to 183 degree, 186 degree, the float locating member 540 moves upward in the press of the lower axis B until 190 degree, the float locating member 540 is coupled into the recess of the upper axis A, and the lower axis B is released from the lock status and can continue to rotate.

It is also understand from FIG. 23 that, the minimum gap between the first axis 520 and the second axis 530 may be less than the size in the direction of the line connecting the center of the first axis and the center of the second axis (or the center of the first cam and the center of the second cam) of the float locating member 540. It is understood that the "minimum gap" mentioned here means the gap between the circular periphery of the first axis 520 and the second axis 530 (or the first cam 522 and the second cam 532, if any), regardless the change of the gap brought by the recess part. Thus, the float locating member 540 is prevented from sandwiching between the circumference part (i.e., the non-recess part) of the first axis 520 and the second axis 530 but not being locked with any one of the first axis 520 and the second axis 530.

Figure 22:
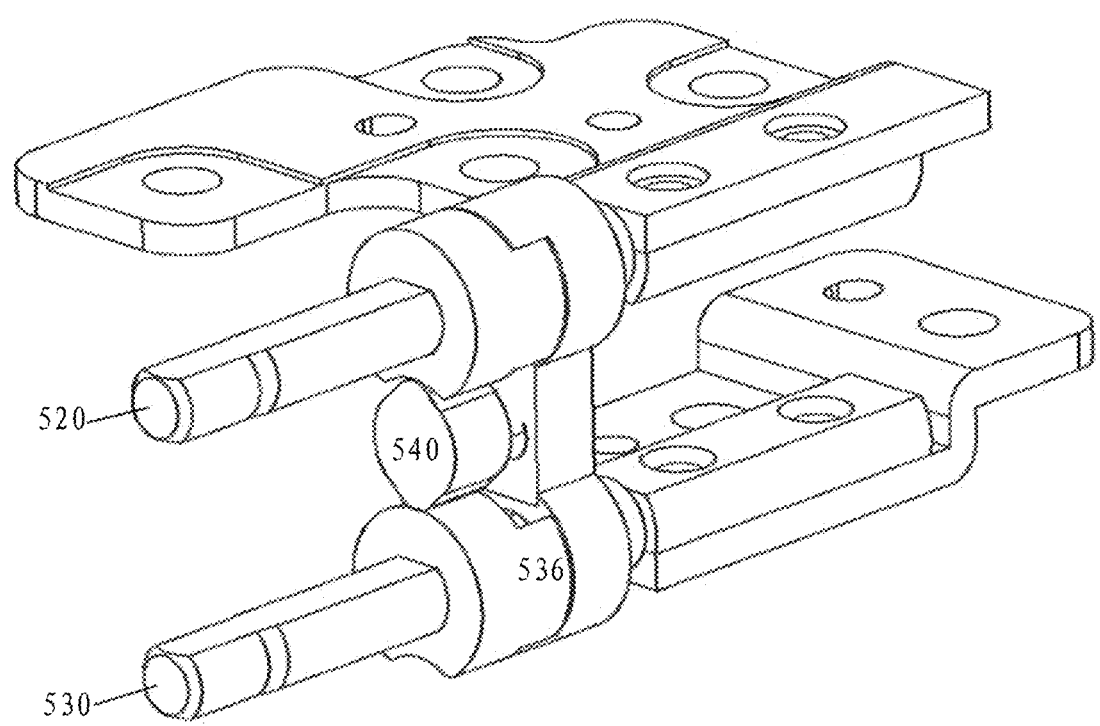

Return to FIG. 18-22, as above mentioned, the second axis 530 can be released from the lock status and can continue to rotate. As shown in FIG. 21, the second axis 530 rotates clockwise with respect to the hinge bracket 510 to a 270 degree status, and as shown in FIG. 22, it can continue to rotate to a 360 degree status. While reaching 360 degree, the stop part 519 on the hinge bracket 510 blocks the second protrusion 536 on the second axis 530 so as to block the continuous rotation of the second axis 530.

The course of rotation from 0 degree to 360 degree is described with reference to FIGS. 18-22 above, the course of rotation from 360 degree to 0 degree will be described inversely with reference to FIGS. 22-18 as follow. As shown in FIG. 22, the hinge device 500 is in a 360 degree rotary status. At this time, the float locating member 540 is pressed against the circumference part (i.e., non-recess part) of the first cam 532 to be coupled in the first recess 524.

When the hinge device 500 starts to rotate for close, since the float locating member 540 is coupled into the first recess 524, the first axis 520 is physically locked and is not able to rotate, the second axis 530 can rotate, e.g., rotate counter-clockwise with respect to the hinge bracket 510. As shown in FIG. 21, the second axis 530 can rotate to a 270 degree position.

Next, the second axis 530 can continue to rotate, e.g., rotate counter-clockwise until a predetermined angle, e.g., preferably 180 degree, as shown in FIG. 20. When the second axis 530 rotates to a predetermined angle, the second recess 534 on the second axis 530 and the first recess 524 on the first axis 520 face each other and are most approximate. At this time, the stop part 519 on the hinge bracket 510 blocks the second protrusion 536 on the second axis 530 (it is shielded in FIG. 20 thus not-illustrated), so as to block the continuous counter-clockwise rotation of the second axis 530 with respect to the hinge bracket 510. That is, at the predetermined angle position, the first recess 524 and the second recess 534 on the first axis 520 and the second axis 530 face each other and are most approximate, and the stop part 519 on the hinge bracket 510 blocks the first protrusion 526 and the second protrusion 536 so that both of the first axis 520 and the second axis 530 can not rotate in one direction (e.g. counter-clockwise) with respect to the hinge bracket 510, and can only rotate in an reverse direction. And at this time the first axis 520 is physically locked by the float locating member 540 and can not rotate with respect to the hinge bracket 510 for the moment.

In this case, in the continuous application of the external force, the second axis 530 brings the hinge bracket 510 with the trend of rotating counter-clockwise with respect to the first axis 520, in other words, the first axis 520 has a trend of rotating clockwise with respect to the hinge bracket 510. The cross section of the first recess 524 on the first axis 520 may have a slant side wall, e.g., arc plane or tapered plane, therefore, the force applied by the side wall of the first recess 524 on the first axis 520 to the float locating member 540 has a downward (i.e., toward the second axis 530) component, and at this time the lower end of the float locating member 540 is not pressed by the circumference part of the second axis 530, so the float locating member 540 can move downward so as to be coupled into the second recess 534 on the second axis 530.

Similar to the case shown in FIG. 23, at this time the first axis 520 can be released from the locked status and continue to rotate. As shown in FIG. 19, the first axis 520 rotates clockwise with respect to the hinge bracket 510 to a 90 degree status, and as shown in FIG. 18, it can continue to rotate to a 0 degree status. While reaching 0 degree, the stop part 519 on the hinge bracket 510 blocks the first protrusion 526 on the first axis 520, so as to block the continuous rotation of the first axis 520.

The course of rotation from 0 degree to 360 degree and from 360 degree to 0 degree of the hinge device 500 according to the sixth embodiment of the invention is described above. Generally, as from 0 degree to 180 degree (or the predetermined angle), the first axis 520 rotates and the second axis 530 rests; and as from 180 degree to 360 degree, the first axis 520 rests and the second axis 530 rotates; and as from 360 degree to 180 degree, the first axis 520 rests and the second axis 530 rotates; and as from 180 degree to 0 degree, the first axis 520 rotates and the second axis 530 rests. It can be seen that the course of rotation for open and close of the hinge device 500 is basically symmetry, which can bring a good user experience.

Further, the torques of the first axis 520 and the second axis 530 can be set to be substantially the same. As rotating, it only needs to press the float locating member 540 at the predetermined angle so as to slide from a recess coupled therewith to the other recess. The inventor found that it hardly perceives a change of the force applied in the course of rotation. Therefore, the hinge device of the embodiment of the invention can implement a more smooth rotation.

Further, since the first axis 520 and the second axis 530 are physically locked by the float locating member 540 when they do not rotate, it prevents an unexpected rotation thereof. The four degrees of freedom (corresponding to the four rotary axes) of the folded apparatus mounted with for example two of the left and the right hinge device is reduced to two by physically locking the two axes, therefore, it can implement a rotation as a conventional notebook computer mounted with two mono-axis hinges, the relative distortion between the screen portion and the base portion is reduced or eliminated.

Figure 24:
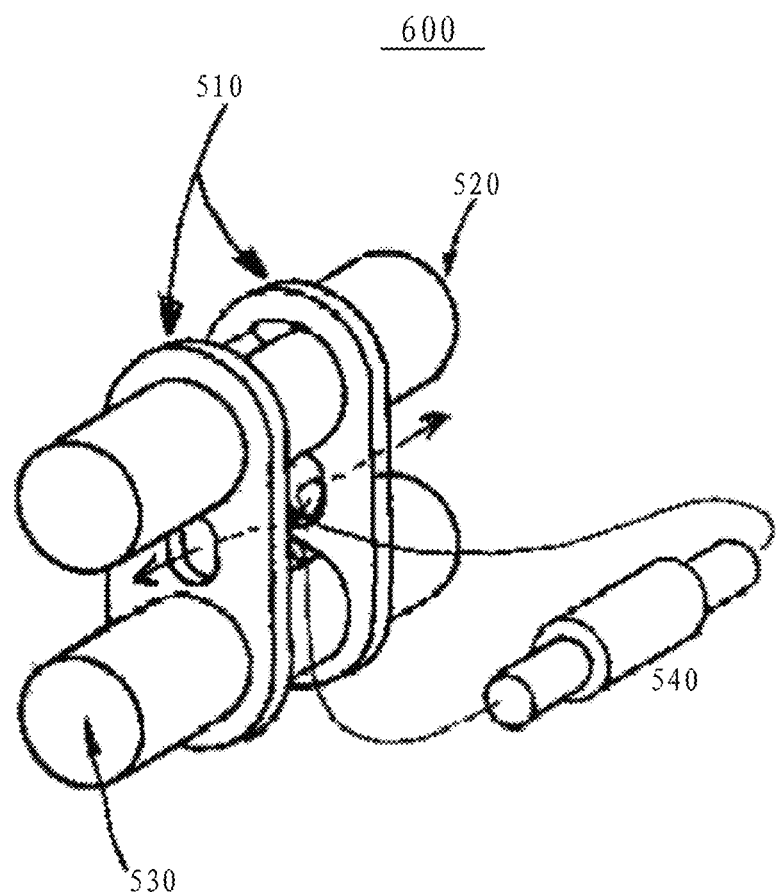
FIG. 24 is a perspective showing a hinge device according to the seventh embodiment of the invention.

FIG. 24 is a perspective showing a hinge device 600 according to the seventh exemplified embodiment of the invention. As shown in FIG. 24, the hinge device 600 comprises a hinge bracket 510, a first axis 520, a second axis 530 and a float locating member 540. For simplicity, there omits many components that are same as/similar to the structure and/or function of the embodiment described above, and the relevant description is omitted following. It is understood the embodiment as shown in FIG. 24 can further comprise many features in the embodiment described above, the existence of these features in the embodiment as shown in FIG. 24 is within the range disclosed in the specification. Likewise, may features in FIG. 24 can be applied to the embodiment described before. For example but not limited, the hinge device 600 further comprises a protrusion formed on the axis and a stop part formed on the hinge bracket or the like, of which the function is substantially similar to the embodiment described previously. Further for example but not limited to, cams are formed on the first axis 520 and the second axis 530 of the hinge device 600 respectively, and recesses are formed on partial circumferences of the cams, as in the previous embodiment. Further for example but not limited, the structure of the hinge bracket 510 of the hinge device 600 can be applied to the embodiment described previously.

As shown in FIG. 24, the hinge bracket 510 comprises two stand plates provided parallel with each other and apart with a predetermined distance, the first axis 520 and the second axis 530 are parallel with each other and provided in the axis sleeves of the hinge bracket 510 in perpendicular to the stand plate. The recesses can be provided directly on each of the first axis 520 and the second axis 530, and can be placed between the two stand plates. The float locating member 540 can have a cylinder shape, and provided parallel between the first axis 520 and the second axis 530. The cylinder of the float locating member 540 can have a circular cross section, and the diameters at two ends can be less than the diameter at the central section. The two ends of the float locating member 540 can be inserted to the opening of a slit such as track shape on the two stand plates, so as to be held between the stand plates and can slide between the first axis 520 and the second axis 530. Thus, the central section can be coupled to the recesses on the first axis 520 and the second axis 530.

The course of rotation of the hinge device 600 is substantially similar to the sixth embodiment described previously, and it is not repeated for redundancy.

With the description of the aforesaid embodiment, those skilled in the art can easily understand that various modification on the forms and the details can be made on the structure of the hinge device of the invention, for example but not limited to the modification on the shape of the float locating member 540 and the way of supporting on the hinge bracket 510, various modifications can be made on the position and the cross-sectional shape of the recesses on the first axis 520 and the second axis 530, as long as the float locating member 540 can slide between the first axis 520 and the second axis 530 under the press of the side wall of the recesses to be coupled from one recess to the other recess.

Figure 25:
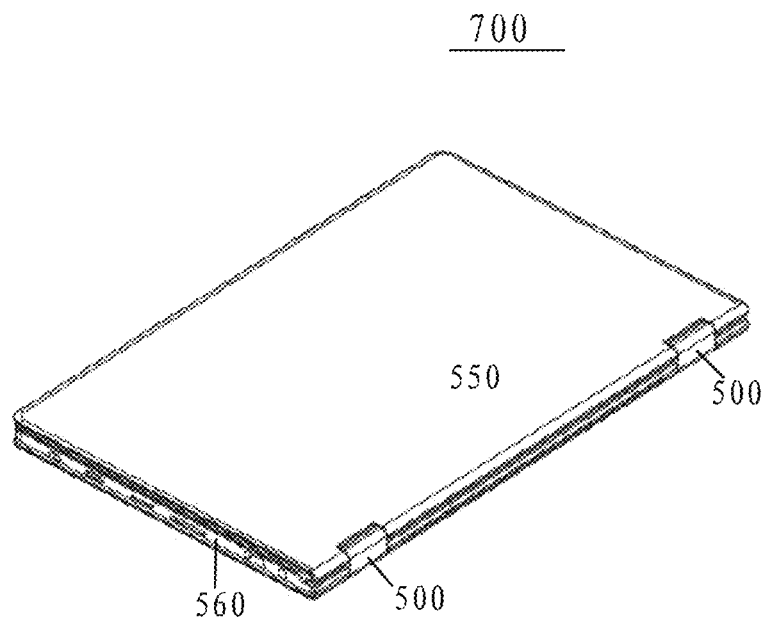
FIG. 25 is a perspective showing a folded apparatus according to the embodiment of the invention.

FIG. 25 shows a folded apparatus 700 including a hinge device according to the embodiment of the present invention. The folded apparatus 700 is for example but not limited to a notebook computer, comprises a first body 550, a second body 560 and at least one hinge device 500 connecting the first body 550 and the second body 560 (two as shown in FIG. 25). The hinge device 500 as shown in FIG. 25 is enclosed in a hinge casing for esthetic appearance. The first body may have for example display unit, it includes, but not limited to liquid crystal display, touch panel screen or the like. The second body 560 may have for example input unit, it includes, but not limited to keyboard such as extension-type keyboard and dustproof keyboard, touch input unit or the like.

The course of rotation of the folded apparatus 700 is similar to the course shown in FIG. 18 to 22, it is not repeated herein for redundancy.

Here, those skilled in the art can understand that the hinge device according to the sixth and seventh embodiments of the invention can be applied individually, or applied in combination with the hinge device capable of implementing a 360 degree open-close motion stably and smoothly according to the first to the fifth embodiments of the invention, and can be applied to the corresponding portable terminal or folded apparatus as hinge device, the embodiment of the invention does not intend to make any restriction.

As for industrial application, the hinge device of the invention can implement a 360 degree smooth and stable open-close, it is suitably used in portable terminal such as notebook computer, mobile phone, PDA.

Though the folded apparatus including the hinge device is described above by taking the notebook computer as example, those skilled in the art can understand that the hinge device of the invention can be also applied to various folded equipments, it includes, but not limited to mobile phone, networked computer, door, window or the like.

What is claimed is:

1. A hinge device, comprising:
a hinge bracket;
a first axis and a second axis provided parallel to each other and supported rotatably by the hinge bracket, the first axis being connected with a first body of an apparatus and the second axis being connected with a second body of the apparatus, the first body being configured to rotate from 0 degrees to 360 degrees and/or from 360 degrees to 0 degrees with respect to the second body by the first axis and the second axis;
a first recess provided on the first axis and a second recess provided on the second axis; and
a float locating member supported by the hinge bracket and configured to slide between the first axis and the second axis to be coupled to the first recess and/or the second recess,
wherein,
when the first body rotates from 0 degrees to a predetermined angle and/or from the predetermined angle to 0 degrees with respect to the second body, the first axis rotates and the second axis rests, and
when the first body rotates from the predetermined angle to 360 degrees and/or from 360 degrees to the predetermined angle with respect to the second body, the second axis rotates and the first axis rests.

2. The hinge device of claim 1, wherein:
when the first body rotates in a direction from 0 degrees to 360 degrees and/or in a direction from 360 degrees to 0 degrees with respect to the second body and when the first body rotates to the predetermined angle, the float locating member transitions from being coupled with one of the first recess and the second recess to being coupled with the other one of the first recess and the second recess.

3. The hinge device of claim 1, wherein a minimum gap between the first axis and the second axis is less than a size of the float locating member in a direction of a line connecting a center of the first axis and a center of the second axis.

4. The hinge device of claim 1, wherein a cross section of each of the first recess and the second recess has a slant side wall.

5. The hinge device of claim 1, wherein the hinge bracket comprises two support plates, the two support plates being parallel to each other and perpendicular to the first axis and the second axis.

6. The hinge device of claim 5, wherein:
the float locating member is sandwiched between the two support plates, and
the first recess and the second recess are between the two support plates.

7. The hinge device of claim 1, further comprising:
protrusions on the first axis and the second axis, and
stop parts corresponding to the protrusions, the stop parts being on the hinge bracket,
wherein,
the protrusions and the stop parts fit so that one of the first axis and the second axis is configured to rotate to the predetermined angle with respect to the hinge bracket, and the other one of the first axis and the second axis is configured to rotate to a remaining angle by subtracting the predetermined angle from 360 degrees with respect to the hinge bracket.

8. The hinge device of claim 7, wherein, when the first axis and the second axis rotate to a position such that the first recess and the second recess face each other and are most approximate, the stop parts block the protrusions so that neither the first axis nor the second axis is configured rotate in a first direction with respect to the hinge bracket, and only rotates in a second direction.

9. The hinge device of claim 1, wherein the predetermined angle is 180 degrees.

10. A hinge device, comprising:
a hinge bracket;
a first axis and a second axis provided parallel to each other and supported rotatably by the hinge bracket, the first axis being connected with a first body of an apparatus and the second axis being connected with a second body of the apparatus, the first body being configured to rotate from 0 degrees to 360 degrees and/or from 360 degrees to 0 degrees with respect to the second body by the first axis and the second axis;
a first cam and a second cam provided on the first axis and the second axis respectively, the first axis and the second axis being configured to bring the first cam and second cam to rotate respectively; and
a float locating member supported by the hinge bracket and configured to slide between the first axis and the second axis to be coupled to a first recess and/or a second recess,
wherein,
when the first body rotates from 0 degrees to a predetermined angle and/or from the predetermined angle to 0 degrees with respect to the second body, the first axis rotates and the second axis rests,
when the first body rotates from the predetermined angle to 360 degrees and/or from 360 degrees to the predetermined angle with respect to the second body, the second axis rotates and the first axis rests,
the first recess is provided on the first cam, and
the second recess is provided on the second cam.

11. The hinge device of claim 10, wherein:
when the first body rotates in a direction from 0 degrees to 360 degrees and/or in a direction from 360 degrees to 0 degrees with respect to the second body and when the first body rotates to the predetermined angle, the float locating member transitions from being coupled with one of the first recess and the second recess to being coupled with the other one of the first recess and the second recess.

12. The hinge device of claim 10, wherein a minimum gap between the first cam and the second cam is less than a size of the float locating member in a direction of a line connecting a center of the first cam and a center of the second cam.

13. The hinge device of claim 10, wherein:
the float locating member is a float locating cam provided between the first axis and the second axis, and
the float locating member is connected to be slidable and unrotatable to the hinge bracket.

14. The hinge device of claim 10, wherein a cross section of each of the first recess and the second recess has a slant side wall.

15. The hinge device of claim 10, wherein the hinge bracket comprises two support plates, the two support plates being parallel with each other and perpendicular to the first axis and the second axis.

16. The hinge device of claim 10, further comprising:
protrusions on the first cam and the second cam, and
stop parts corresponding to the protrusions, the stop parts being on the hinge bracket,
wherein,
the protrusions and the stop parts fit so that one of the first axis and the second axis is configured to rotate to the predetermined angle with respect to the hinge bracket, and the other one of the first axis and the second axis is configured to rotate to a remaining angle by subtracting the predetermined angle from 360 degrees with respect to the hinge bracket.

17. The hinge device of claim 16, wherein, when the first axis and the second axis rotate to a position such that the first recess and the second recess face each other and are most approximate, the stop parts block the protrusions so that neither the first axis nor the second axis is configured to rotate in a first direction with respect to the hinge bracket, and only rotates in a second direction.

18. A hinge device, comprising:
a hinge bracket;
a first axis and a second axis provided parallel to each other and supported rotatably by the hinge bracket, a first recess and a second recess being provided on the first axis and the second axis, respectively; and
a float locating member supported by the hinge bracket and configured to slide between the first axis and the second axis to be coupled to the first recess and/or the second recess,
wherein a minimum gap between the first axis and the second axis is less than a size of the float locating member in a direction of a line connecting a center of the first axis and a center of the second axis.

19. The hinge device of claim 18, wherein:
the first axis and the second axis have a first cam and a second cam provided thereon respectively, the first axis and the second axis bring the first cam and the second cam to rotate,
the first recess is provided on the first cam, and
the second recess is provided on the second cam.

20. The hinge device of claim 19, further comprising:
protrusions on the first cam and the second cam, and
stop parts corresponding to the protrusions, the stop parts being on the hinge bracket,
wherein,
the protrusions and the stop parts fit so that one of the first axis and the second axis is configured to rotate to a predetermined angle with respect to the hinge bracket, and the other one of the first axis and the second axis is configured to rotate to a remaining angle by subtracting the predetermined angle from 360 degrees with respect to the hinge bracket.

21. The hinge device of claim 20, wherein, when the first axis and the second axis rotate to a position such that the first recess and the second recess face each other and are most approximate, the stop parts block the protrusions so that neither the first axis nor the second axis can rotate in a first direction with respect to the hinge bracket, and only rotates in a second direction.

22. The hinge device of claim 20, wherein, when the first axis and the second axis rotate to a position such that the first recess and the second recess face each other and are most approximate, the float locating member transitions from being coupled with one of the first recess and the second recess to being coupled with the other one of the first recess and the second recess.

23. The hinge device of claim 18, wherein:
a diameter of at least one end of a cylinder is less than a diameter of a central section, and
a slit opening is provided on the hinge bracket, at least one end of the cylinder is inserted into the slit opening to be able to slide between the first axis and the second axis so that the central section can be coupled to the first recess or the second recess.

24. The hinge device of claim 18, wherein a cross section of each of the first recess and the second recess has a slant side wall.

25. The hinge device of claim 18, wherein the hinge bracket comprises two support plates, the two support plates being parallel to each other and perpendicular to the first axis and the second axis.

26. The hinge device of claim 25, wherein:
the float locating member is sandwiched between the two support plates, and
the first recess and the second recess are between the two support plates.

27. The hinge device of claim 18, further comprising:
protrusions on the first axis and the second axis, and
stop parts corresponding to the protrusions, the stop parts being on the hinge bracket,
wherein,
the protrusions and the stop parts fit so that one of the first axis and the second axis is configured to rotate to a predetermined angle with respect to the hinge bracket, and the other one of the first axis and the second axis is configured to rotate to a remaining angle by subtracting the predetermined angle from 360 degrees with respect to the hinge bracket.

28. The hinge device of claim 27, wherein, when the first axis and the second axis rotate to a position such that the first recess and the second recess face each other and are most approximate, the stop parts block the protrusions so that neither the first axis nor the second axis can rotate in a first direction with respect to the hinge bracket, and only rotates in a second direction.

29. The hinge device of claim 27, wherein the predetermined angle is 180 degrees.

30. The hinge device of claim 27, wherein, when the first axis and the second axis rotate to a position such that the first recess and the second recess face each other and are most approximate, the float locating member transitions from being coupled with one of the first recess and the second recess to being coupled with the other one of the first recess and the second recess.

* * * * *